Figure 1:
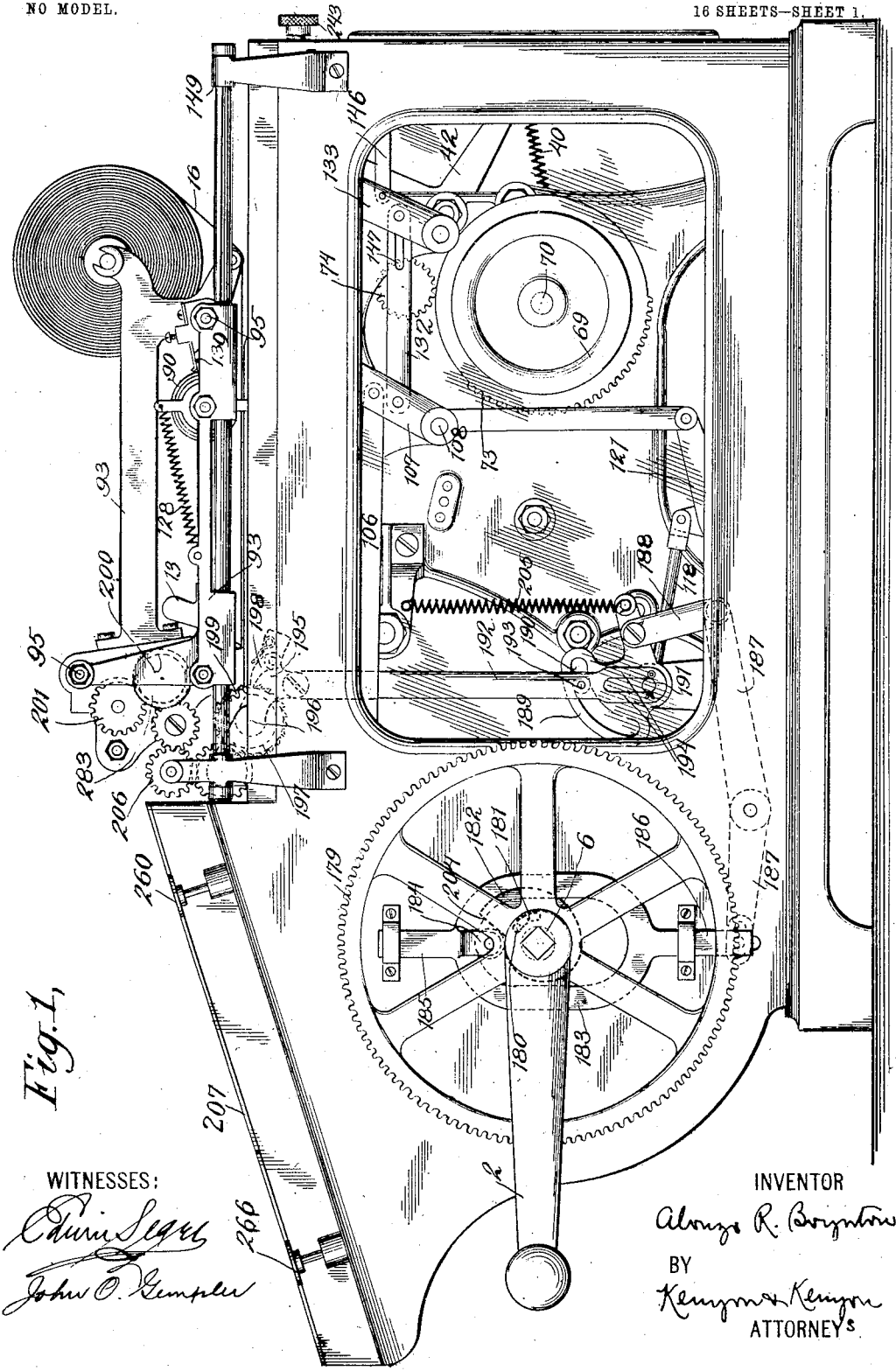

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 1.

WITNESSES:

INVENTOR
Alonzo R. Boynton
BY
Kenyon & Kenyon
ATTORNEYS.

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 3.

WITNESSES:
INVENTOR
Alonzo R. Boynton
BY
Kenyon & Kenyon
ATTORNEYS

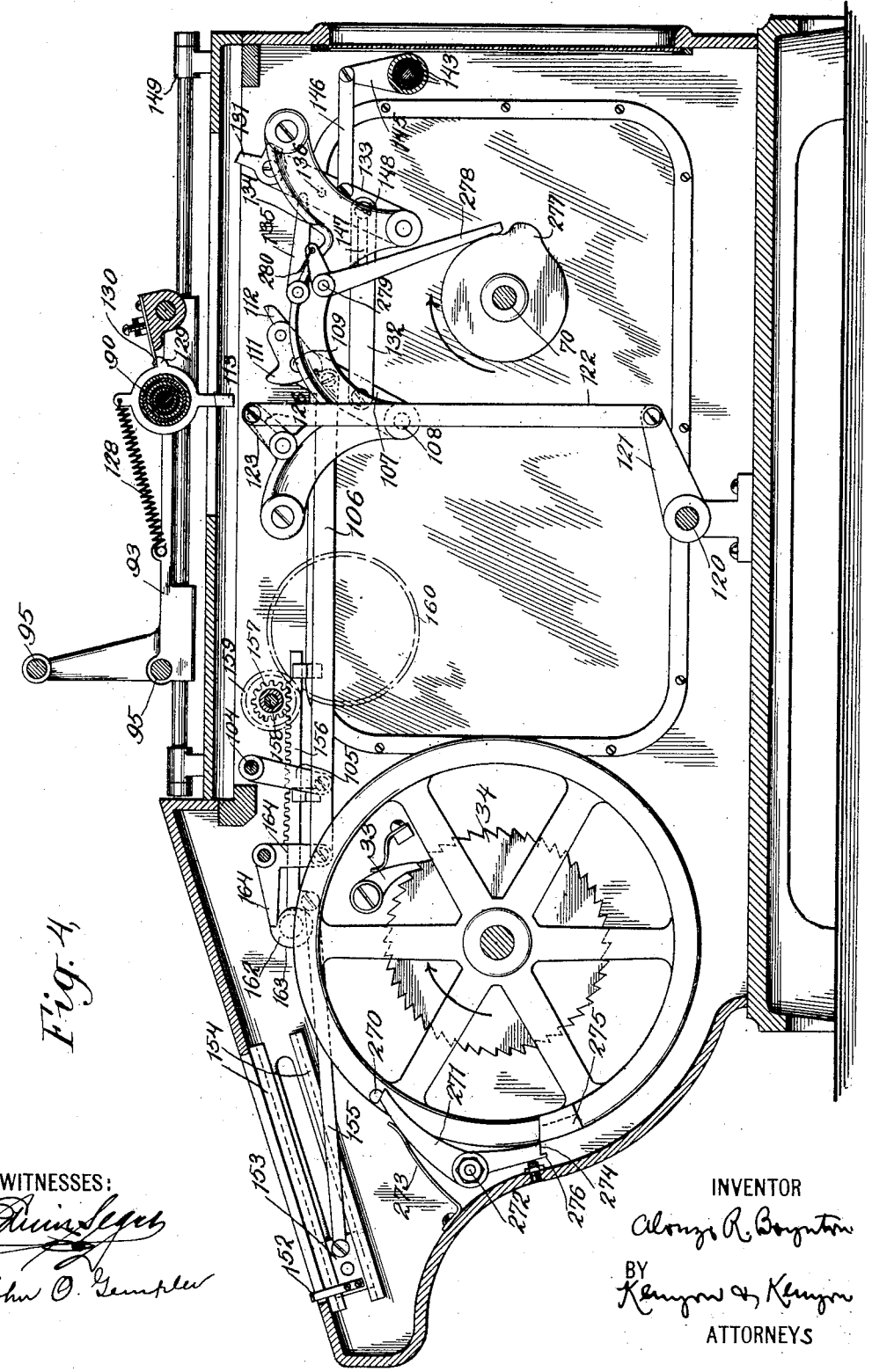

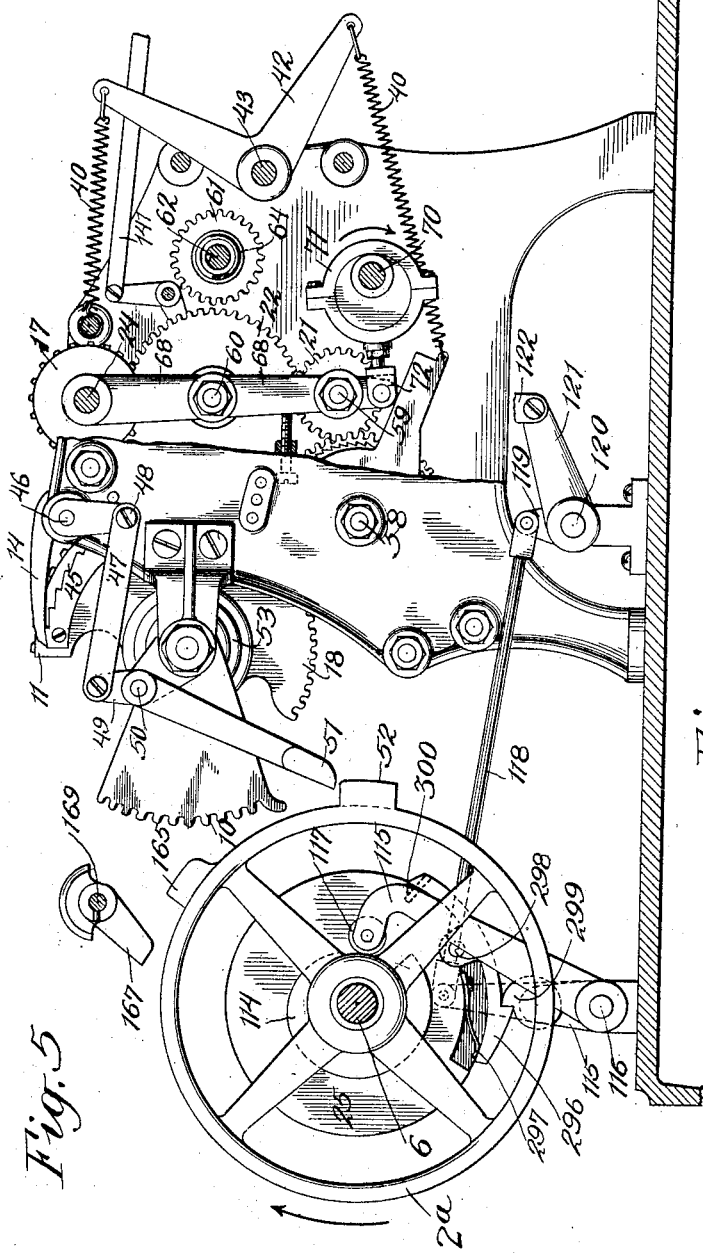

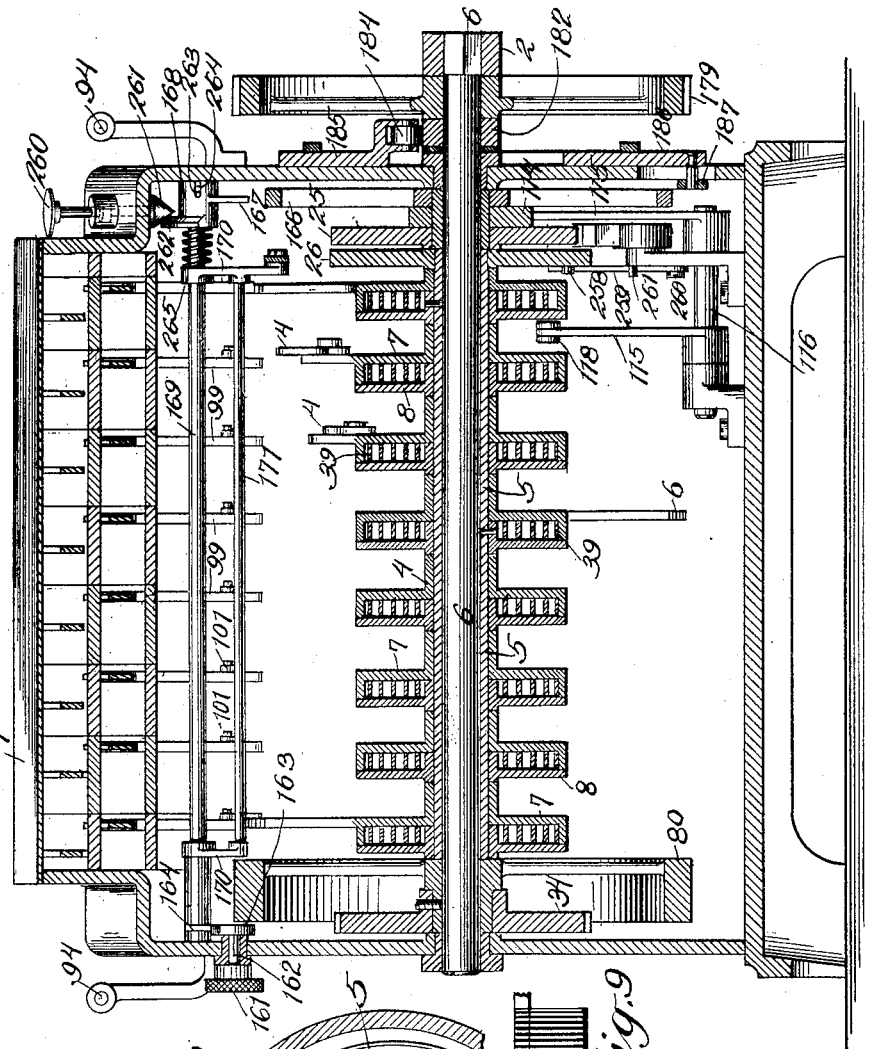

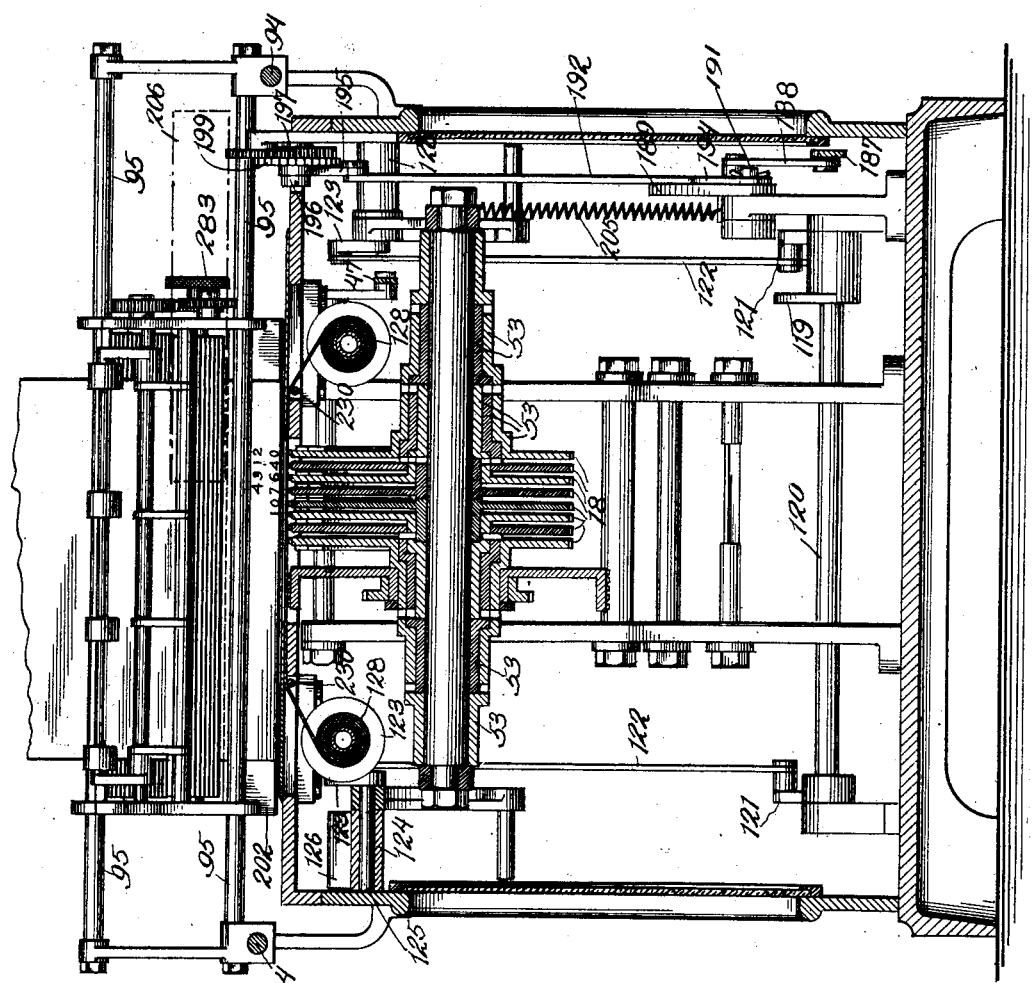

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 9.
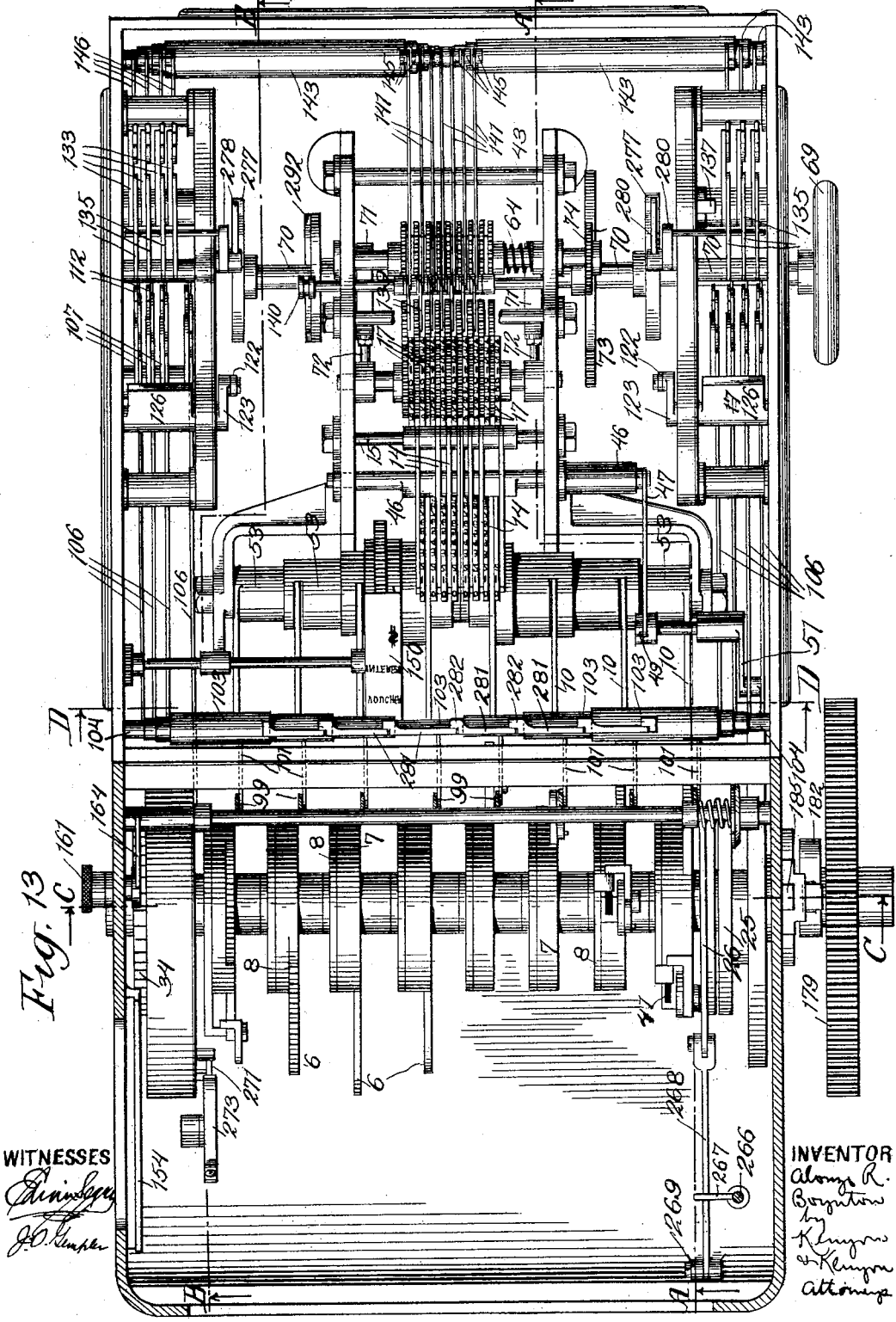

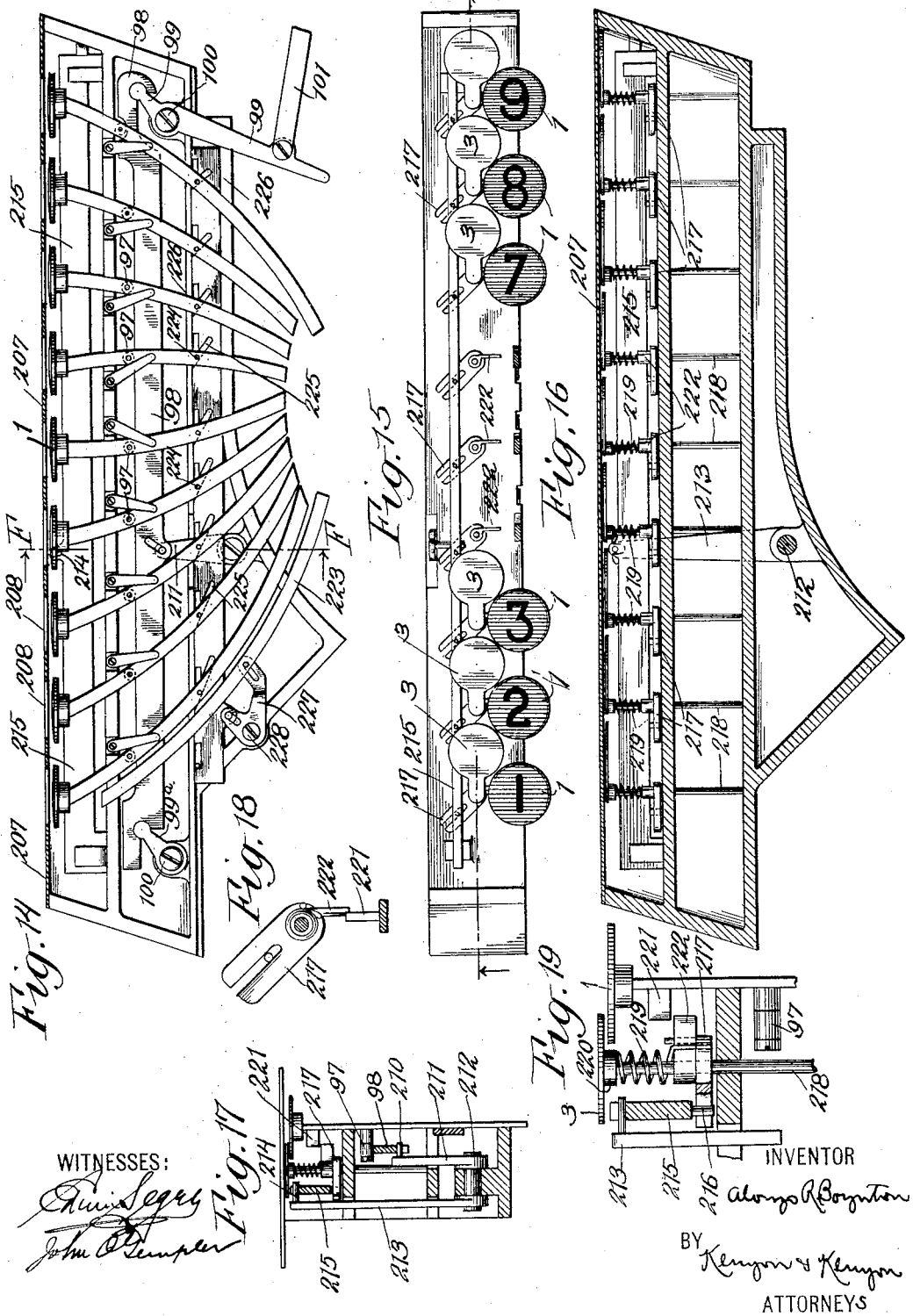

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 11.

WITNESSES:

INVENTOR
Alonzo R. Boynton
BY
Kenyon & Kenyon
ATTORNEYS

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 12.
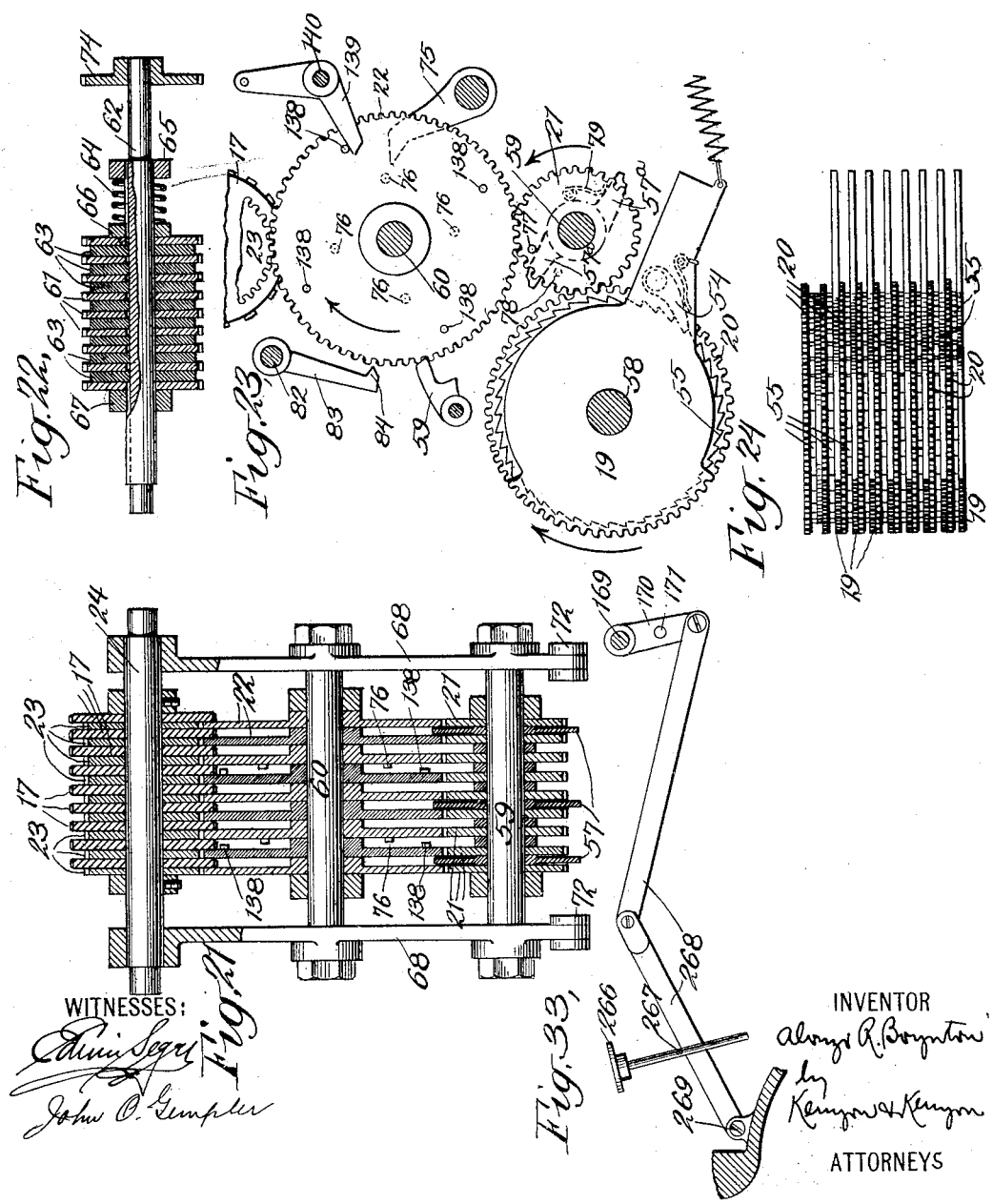

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 13.

WITNESSES:

INVENTOR
Alonzo R. Boynton
BY
Kenyon & Kenyon
ATTORNEYS

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 14.
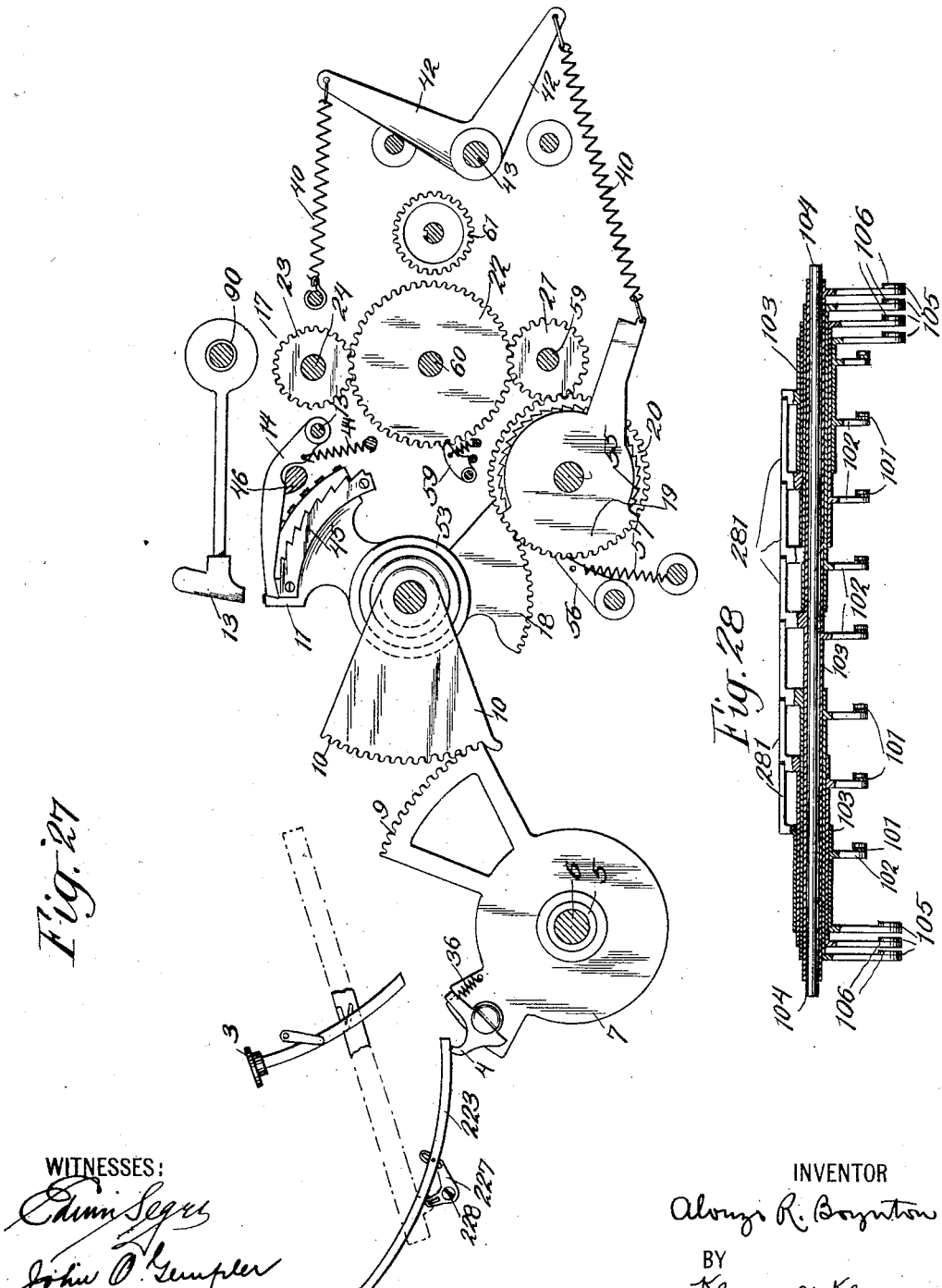

No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 15.
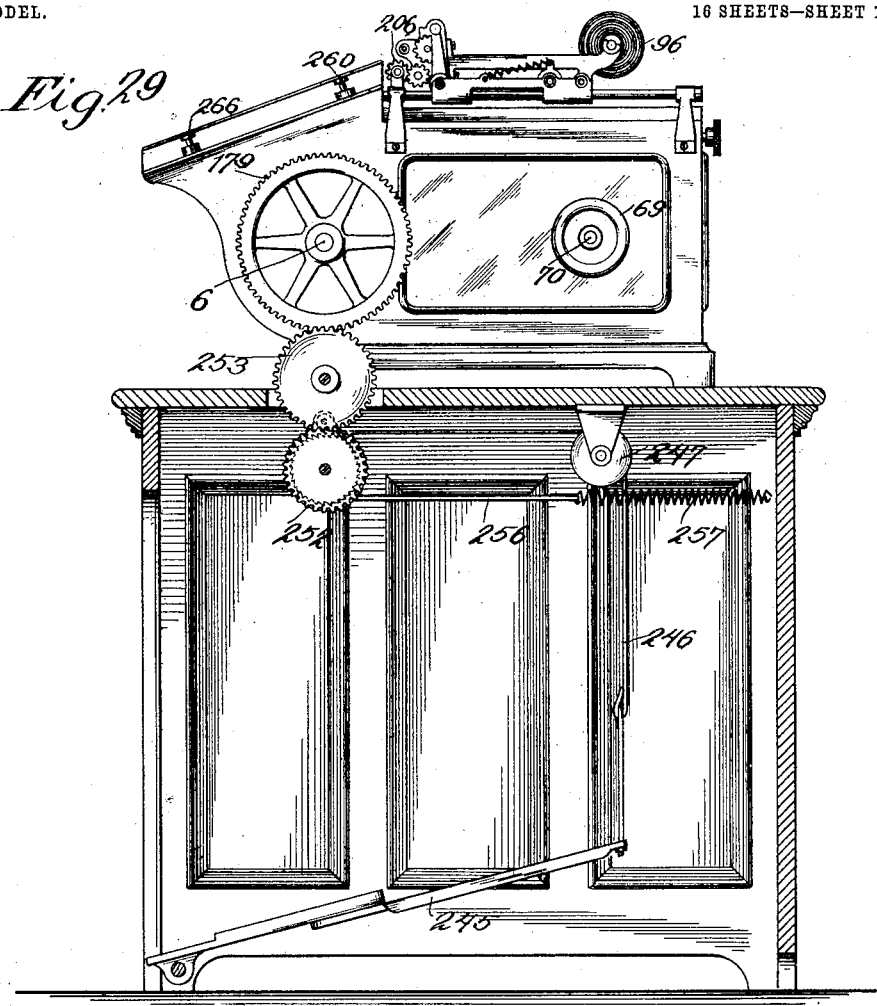
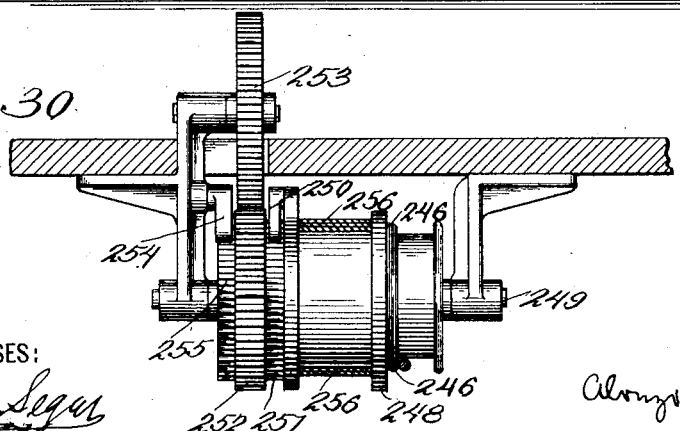
WITNESSES:
INVENTOR
Alonzo R. Boynton
BY
Kenyon & Kenyon
ATTORNEYS No. 745,144. PATENTED NOV. 24, 1903.
A. R. BOYNTON.
CALCULATING MACHINE.
APPLICATION FILED MAY 6, 1902.
NO MODEL. 16 SHEETS—SHEET 16.
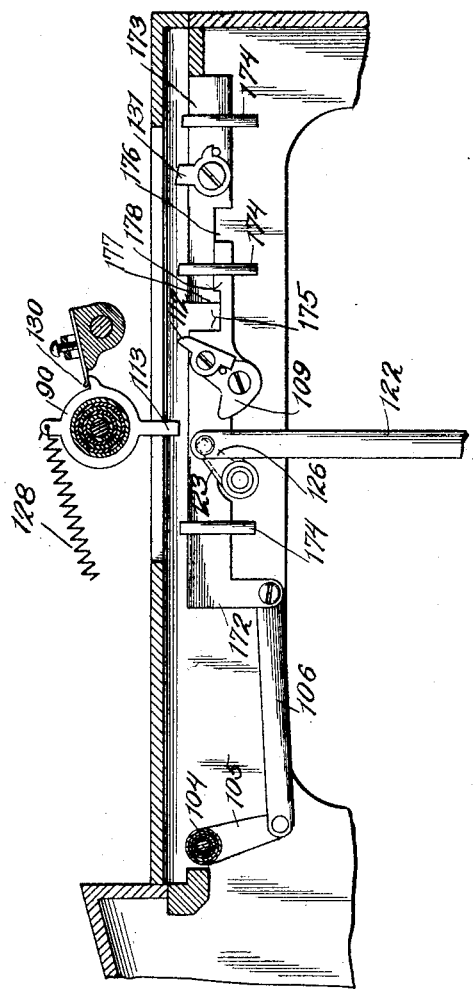
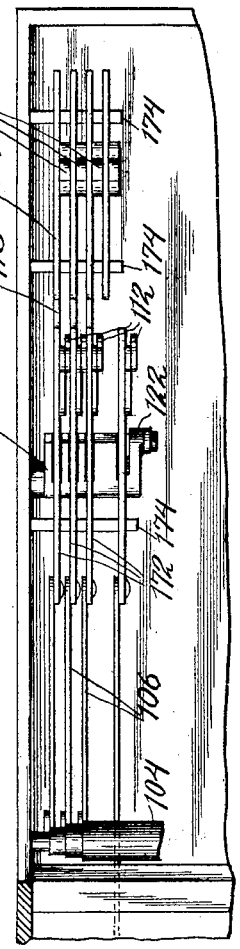

No. 745,144.  
Patented November 24, 1903.

UNITED STATES PATENT OFFICE.

ALONZO R. BOYNTON, OF BINGHAMTON, NEW YORK, ASSIGNOR TO BUNDY MANUFACTURING COMPANY, A CORPORATION OF NEW YORK.

CALCULATING-MACHINE.

SPECIFICATION forming part of Letters Patent No. 745,144, dated November 24, 1903.

Application filed May 6, 1902. Serial No. 106,169. (No model.)

*To all whom it may concern:*

Be it known that I, ALONZO R. BOYNTON, a citizen of the United States, and a resident of Binghamton, county of Broome, and State of New York, have invented certain new and useful Improvements in Calculating-Machines, of which the following is a specification.

My invention relates to adding-machines and to machines for bringing suitable characters upon a printing, reading, or adding line.

It has for its object to improve and simplify such machines, to make them more certain and accurate in operation, and, generally, to improve the construction and mode of operation of such machines; also, to provide means for hiding all the keys of series when one key is operated and to more effectually protect the keys and the parts immediately connected with them; also, to prevent any operation of the machine unless one or more keys are struck; also, to provide improved means for driving such machines; also, to make the action of the main shaft of the machine steadier and less likely to vibrate or wabble; also, to provide an improved means for nesting the type-wheels together, so as to provide ample room for the keys and connecting parts and yet cause the printing and adding type to be compact and close together; also, to improve means for resetting the adding-wheels to make such devices more truly automatic and capable of being thrown into operation to reset the total-adding wheels and to be thrust out by a single act of the operator; also, to aline the total-adding wheels to improve the printing of the totals; also, to provide individual hammers for the different orders or numbers or other characters and simple and efficient means for placing them in set position ready for operation and improved means for operating them; also, to provide simple and efficient means for printing the totals and means that can be readily operated; also, to provide means for printing suitable words alongside of the numbers that are set up in the printing or adding line and to print such numbers; also, to provide means for causing the triggers for the hammers of all lower orders to be set up when a key of a higher order is struck.

My improvement is shown in the drawings accompanying this specification and forming a part hereof in connection with a printing and adding machine adapted for bringing numbers mounted upon suitable type-wheels upon a printing or reading line and in connection therewith for adding the numbers from time to time set up upon the machine. It can be used, however, in part at least, in machines in which other characters than numbers are used and in which the characters are set up either for printing or reading purposes or for adding purposes or for all of these purposes.

In the drawings I have shown and will now proceed to describe a machine embodying my invention in its preferred form.

Figure 2:
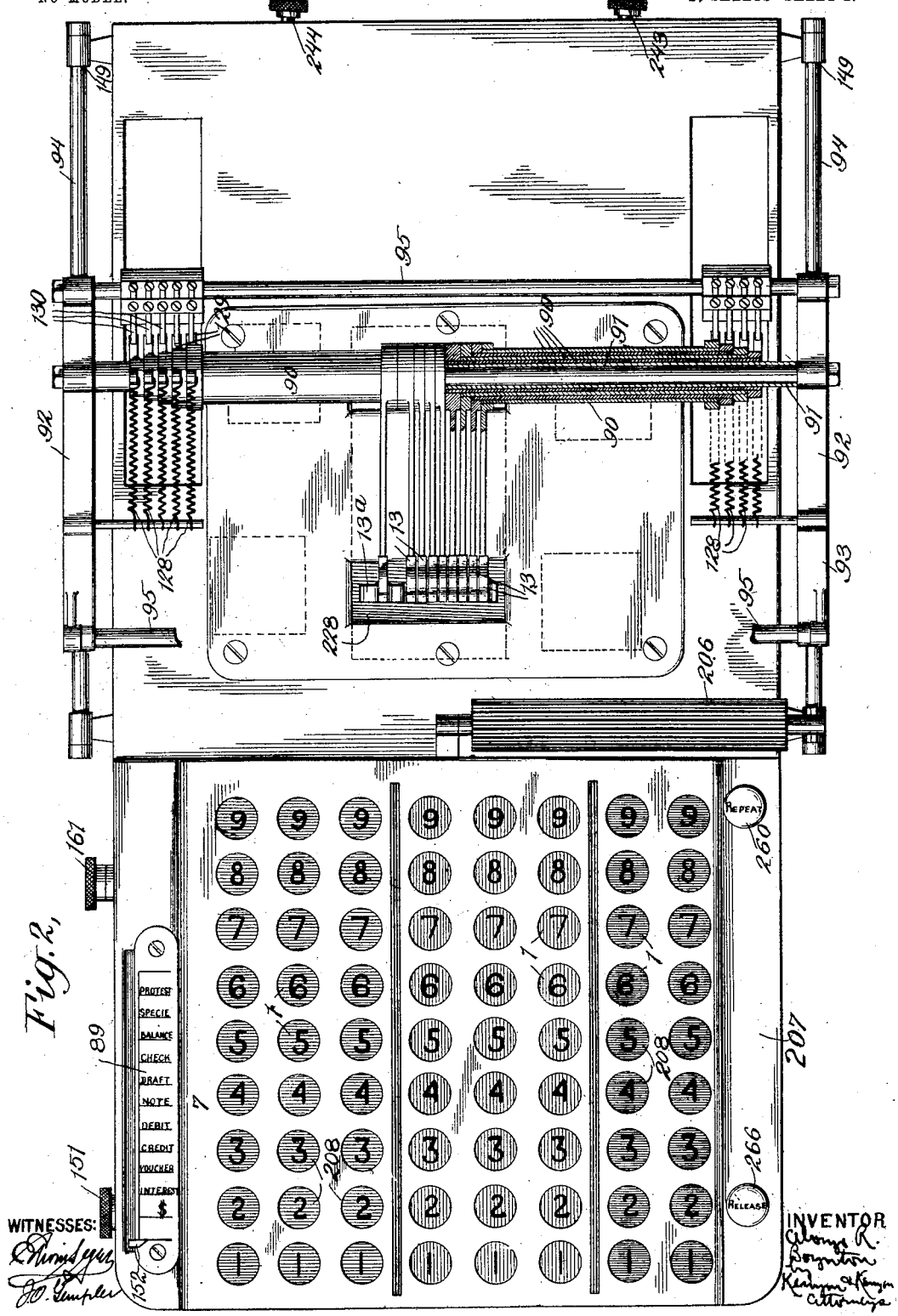
Figure 3:
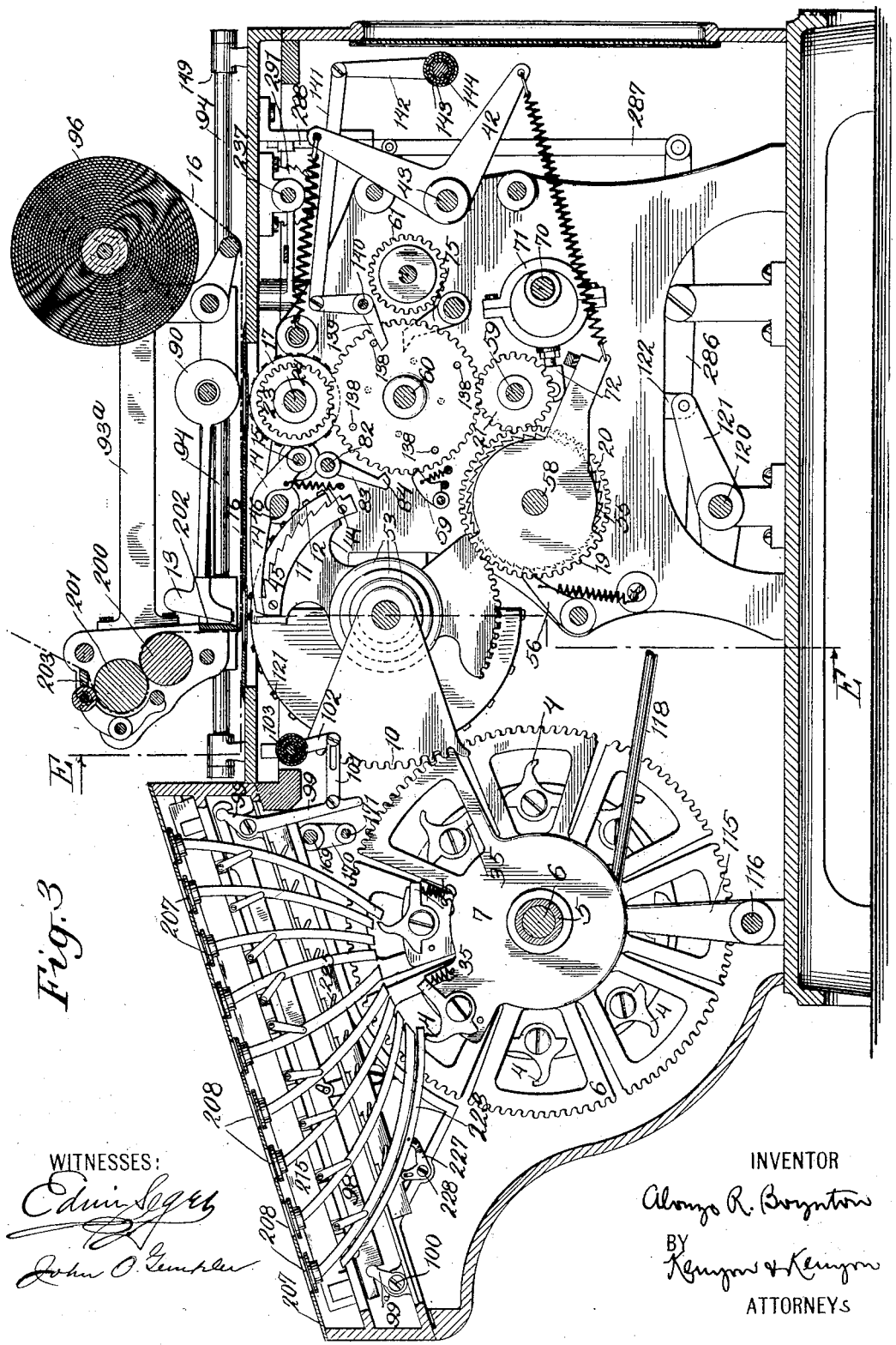
Figure 12:
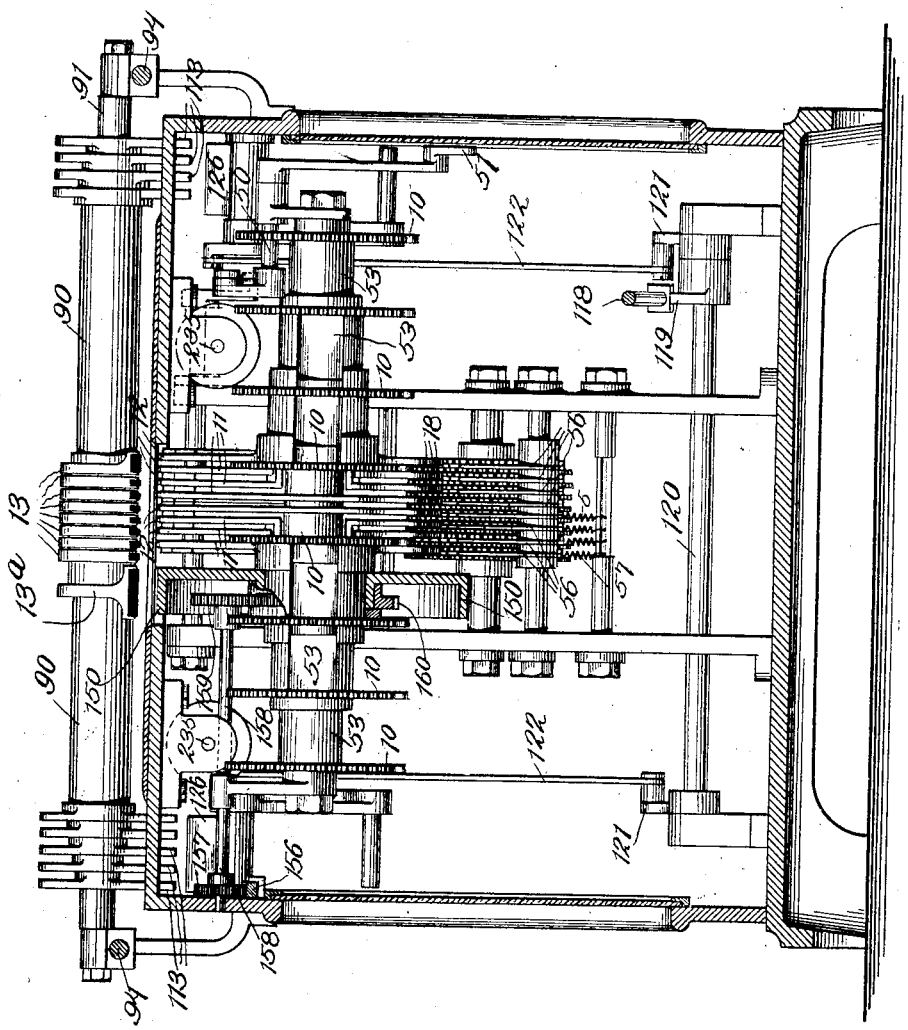
Figure 20:
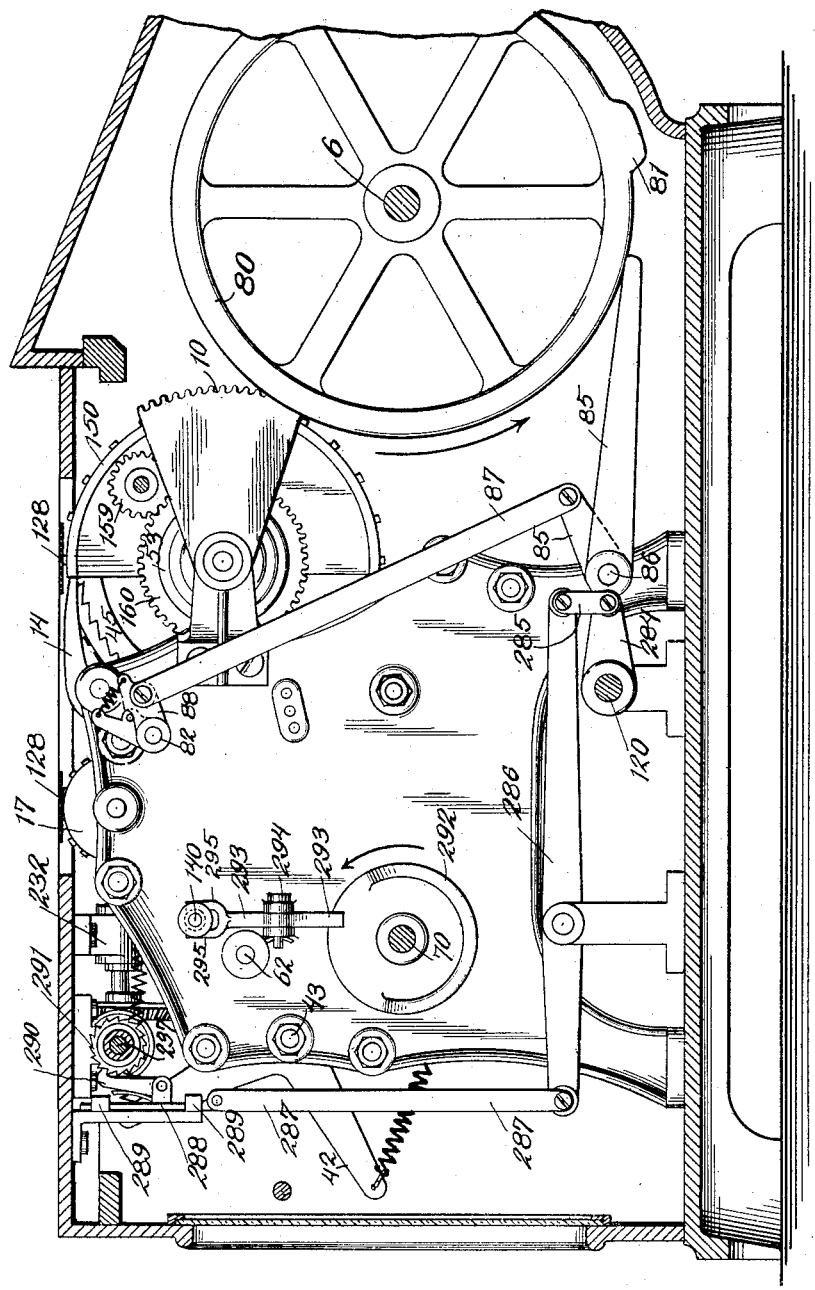
Figure 25:
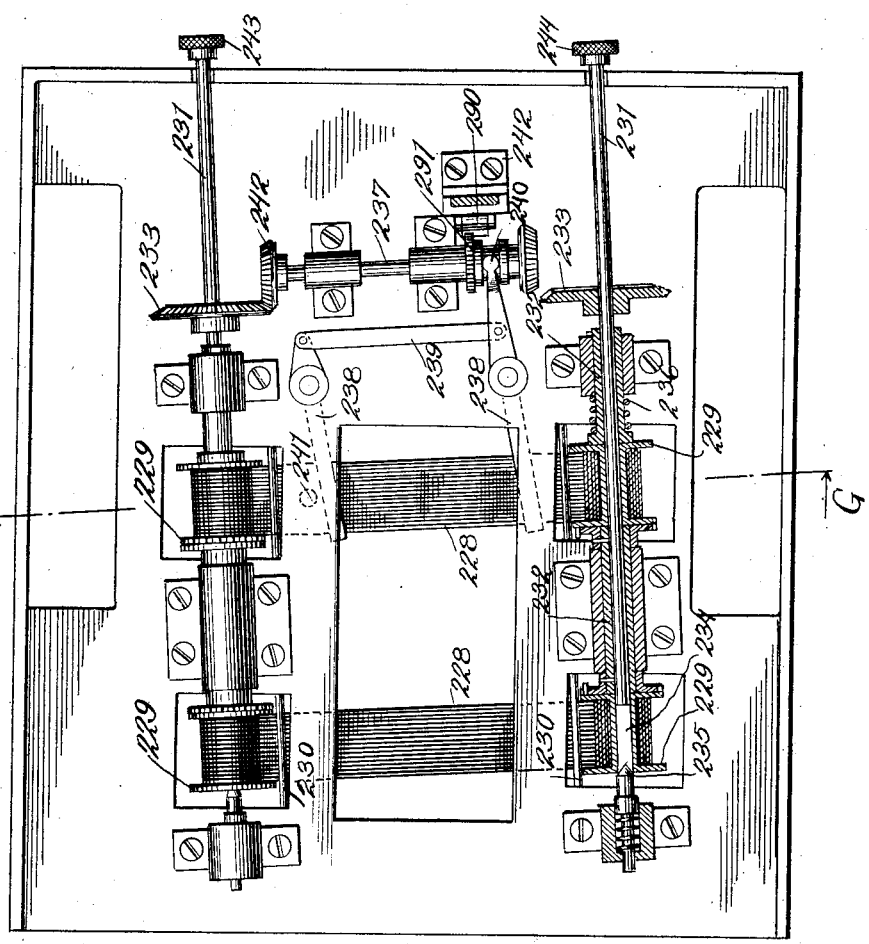
Figure 26:
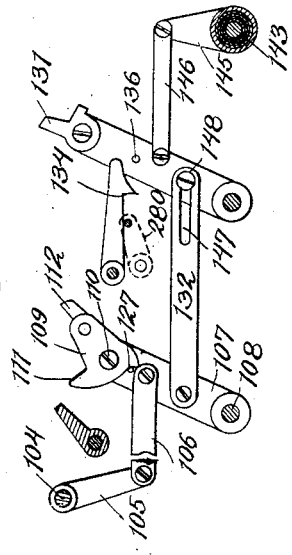

Referring now to the specific embodiment of my invention shown in the drawings, Figure 1 is a side elevation of such a machine with part of the casing removed. Fig. 2 is a horizontal view, partly in section, through the hammer-sleeves. Fig. 3 is a vertical longitudinal section taken on the lines A A of Fig. 13 viewed as shown by the arrow. Fig. 4 is a vertical longitudinal section taken on the lines B B of Fig. 13. Fig. 5 is a side elevation of parts of the machine. Fig. 6 is a detail of the ink-ribbon-feeding device. Fig. 7 is a vertical cross-section taken on the lines C C of Fig. 13. Figs. 8 and 9 are details of the wheels mounted on sleeve 5. Fig. 10 is a vertical cross-section taken through the sleeves of the type-wheels on the lines E E of Fig. 3. Fig. 11 is a detail of the stop mechanism. Fig. 12 is a vertical cross-section taken on the lines D D of Fig. 13. Fig. 13 is a plan of the machine with the carriage and keys and connecting parts removed. Figs. 14 to 19, inclusive, are details of the keys and screens and their connecting parts, Fig. 17 being a detail taken on the lines F F of Fig. 14. Fig. 20 is a side elevation of certain of the parts of the machine. Figs. 21 to 24 are details of the adding-wheels and the resetting devices. Fig. 25 is a detail of the ink-ribbon-feeding mechanism. Fig. 26 is a detail of the hammer-triggers. Fig. 27 is a diagrammatic view illustrative of the general operation of the machine. Fig. 28 is a vertical section through the sleeves which operate the hammer-triggers. Figs. 29 and 30 are modifications showing means for driving the machine by foot-power. Figs. 31 and 32 show a modification of the hammer-triggers. Fig. 33 is a detail of the release-key and its connecting mechanism.

Before proceeding to describe in detail the embodiment of my invention shown in the drawings I will for the purpose of clearness first briefly describe the work done by that machine, referring in this connection more particularly to Figs. 1, 2, 3, 7, 13, 14, 15, and 27. My said machine shown in the drawings is provided with keys 1, arranged in series, preferably a bank of keys consisting of a plurality of series of keys arranged in the usual way, the two series at the right hand of Fig. 2 representing cents and those to the left representing dollars. The machine is operated by depressing the keys corresponding to the number it is desired to set up on the reading or printing line or to add, and by turning a crank 2 (shown in Fig. 1) one complete revolution the rest of the work is done automatically by the machine. Each key as it is depressed is locked in its set position, and as it is thus operated it causes a screen 3 to be moved over every other key of its series, thus preventing the striking of any other key of that series and enabling the operator when it has set up a number to see at a glance whether it is correct or not. The means by which these various steps are effected will be described later on in detail. As each key is moved into its set position the lower end of its shaft is depressed into a path of a projection 4 from one of a set of wheels arranged upon a sleeve 5, secured to a shaft 6, upon which shaft crank-wheel 2 is mounted and by which it and sleeve 5 and the wheels carried by it are rotated. One of these wheels carrying projection 4 is shown at 7, Fig. 27. As many wheels 7 are provided upon a sleeve 5 as there are series of keys. Each wheel is composed in the form shown in the drawings of two parts—one part 8, which is fast to sleeve 5, and the part 7, which is loosely mounted upon said sleeve. When shaft 6 rotates as crank 2 is turned, the fast parts 8 of these wheels cause the loose parts 7 to rotate. This is done by means of a detachable lock, presently to be described, which at times connects parts 8 and 7 together and which at other times frees them. Normally the lock connects parts 7 and 8 together. As shaft 6 rotates, projecting portion 4 of the loose part 7 of the wheel strikes against the stop by the inner end of the depressed key of the corresponding series. This causes the detachable lock-connecting parts 7 and 8 to free these parts, disconnecting them from each other and permitting part 8 to rotate onward with sleeve 5 and crank 2, while the loose part 7 is held against the stop of the key. Of course the distance traversed by wheel 7 before it comes to stop depends upon which one of the series is depressed, key 9, for example, allowing a further rotation than any lower key. Teeth 9 upon a segment of wheel 7 mesh with teeth 10 upon a segment of type-wheel 11, the latter carrying type 12, adapted to be brought upon a printing-line immediately below hammers 13 as type-wheel 11 is rotated. One type-wheel 11 is provided for each series of the keys. The particular type upon a type-wheel brought upon the printing-line at any time will of course be dependent upon the particular key depressed in the corresponding series of keys. The type-wheels 11 are held in set position by a series of spring-pressed pawls 14 upon a shaft 15. A strip of paper 16 is passed below hammers 13 and above the type 12, upon which at the proper time the numbers are printed. By depressing one of these keys and turning crank 2 a number composed of the digits corresponding with those of the depressed keys will be brought upon the printing-line and will be printed upon the paper.

As the paper is fed forward immediately after the printing is effected, the number printed comes into a position where it can be seen by the operator, and any error can at once be detected. At the same time and by the same operation the number thus set up will be added to the total-adding wheels 17. There is of course one of these wheels for each series of keys and in addition thereto one or two or three extra ones in the totals. In the drawings I have shown one extra adding-wheel. The motion is transmitted from type-wheels 11 through teeth 18 to the total-adding wheels through a series of reciprocating toothed segments 19 and transferring adding-wheels 20 21 22 and gear 23 on the shaft 24 of the total-adding wheels, suitable pawls being employed to prevent backward rotation of the parts and suitable mechanism for carrying from one to the next higher wheel. In this way each number that is set up upon the printing or reading line is also added to the numbers on the adding-line or the type-line of the adding-wheels 17. A printed impression of this total may be obtained at any time, as will be presently described. In the course of rotating crank 2 the impression mechanism of the number set up is automatically actuated, and the paper and ink-ribbon used in the printing are automatically fed forward, and then the type-wheels and the wheels upon the sleeve of the main shaft, the sleeve itself, and the keys are all released and returned to their normal positions. All of these operations are performed by a rotation of crank 2 in one direction only and in a complete rotation of the crank. I also provide suitable mechanism for resetting the total-adding wheels at any desired time, as will hereinafter be described.

I will now proceed to describe more in detail each of the parts and operations referred to above in a general way and also to certain other features of my improvements not hereinbefore specifically alluded to.

*The keys and their connecting mechanism.*—These are illustrated in Figs. 3, 14 to 19. I prefer to arrange the keys so that they are seen and will be struck through openings or apertures in a protecting covering or casing. At shown, 207 is a protecting plate or covering extending over the bank of keys and provided with openings or apertures 208, through which the keys can be seen and struck. I also preferably provide a series of screens 3, one for each key, and so arrange them that whenever a key of the series is struck the screens for all of the other keys will be moved over those keys; but the screen of the key which is struck will not be moved into screening position, so that the only key of the series that will appear is the one that has been struck. In this way after setting up any number upon the bank of keys the operator can tell at a glance whether he has set up the right number. He is also prevented from striking two keys of a series. For this purpose I provide a common actuating part adapted to be moved by each key of the series as it is depressed and connect such common actuating part with all of the screens of the series to move them into and out of their positions over the keys. I also provide a stop which is thrown into position when a key is operated to prevent its particular screen from being moved. In order to accomplish this and yet to move the other screens, the common actuating part is connected with each screen by a flexible or elastic connection which will be sufficient to impart motion from the common actuating part to the screen to move it, except when a positive stop is thrown by a particular key into the path of movement of its screen. Many different devices may of course be used for these purposes. The particular form of devices shown in the drawings consists of the following: The stem of each key is provided with a horizontal stud carrying a roller 97, resting upon a bar 98, which runs across under all of the keys of its series, as has been already described. As bar 98 is swung to the right, as shown in Fig. 14, as a key is depressed, it strikes against the pin 210, which projects from the side of the arm 211, fast on rock-shaft 212, as shown in Fig. 17. This rock-shaft carries another arm, 213, which is also provided with a pin 214, projecting from its side and entering a recess in bar 215, (shown also in Fig. 14,) which stretches the length of the series of keys. Bar 215 is moved to the right as viewed in Fig. 14 as a key is depressed. This bar is provided with a series of pins 216, each one of which engages with a rocking piece 217, loosely mounted upon the stud 218, carrying at its head a screen 3. Rocking piece 217 is flexibly or elastically connected with screen 3 or its stem 218 by means of a spring 219, which is secured at its lower end to piece 217 and at its upper end to a collar 220, fast on stem 218. As the key is depressed, piece 217 is rocked on the stem 218 and through spring 219 swings screen 3 over its key. This takes place with every screen of the series except that of the key which is depressed. To prevent this operation in the latter case, I provide a stop 221, mounted on the stem of the key, which immediately upon the starting downward of the key is thrown into engagement with a stop 222, fast upon stem 218, preventing rotation of the stem and its screen 2. It will of course be understood that each series of keys is provided with similar apparatus.

In order to prevent any setting up of any number on the printing-line or in adding unless a key is depressed, I provide a series of stops 223, one for each series of keys. These are shown at the left in Fig. 14 in their depressed or stop positions. Should the crank be rotated, the projections 4 from the wheels 7 would be held by these stops 223 in the position shown in Fig. 27 before type-wheels 11 had begun to move. If there were no such stops provided and the operator should move the crank-arm without first depressing a key, numbers "9" would be set up on the printing-line and would be added. The depression of the key automatically withdraws stop 223 of the series from its operative position. As shown, this is done in the following way: The stem of each key of the series has a pin 224 projecting from the side of the stem and normally directly over an inclined slot 225 in a locking-bar 226, which also runs across the machine, as shown in Fig. 14. When a key is depressed, pin 224 forces bar 226 to the left. This moves all of the other slots from under their respective pins 224 and locks every other key of the series in position. It also throws upward and to the left a bell-crank 227, pivoted in the framework at 228 and secured by one arm to the bar 226 and by the other arm to stop 223 by means of a pin and slot, as shown in Fig. 14. When the keys are returned to their normal position, locking-bar 226 is moved to the right, throwing stop 223 down to its operative position.

*The main shaft, its sleeve and wheels, and connecting parts.*—These are illustrated especially in Figs. 1, 3, 5, 7, 8, 13, and 27. Crank-wheel 2 is securely mounted upon main driving-shaft 6, which runs clear across the machine, as shown in Fig. 7, and upon it is mounted sleeve 5, which carries the wheels 7 and 8. Wheel 2 on shaft 6 is always rotated in the same direction. Sleeve 5 is arranged to have a reciprocating motion upon shaft 6 moving in one direction with its wheels to bring the desired characters upon the printing-line and in the other direction at the close of the entire operation, and when crank-wheel 2 has substantially reached the end of a complete revolution. The shaft and sleeve are connected together by a detachable lock, which is adapted in one position to lock them together to move the sleeve in one direction as the crank is rotated and in the other direction to unlock them to permit the sleeve to return to its normal position by means of springs, as shown. The detachable locks and their connections are as follows: Fixedly mounted upon shaft 6 is a disk 25, and similarly mounted upon sleeve 5 is a disk 26. Disk 25 has pivoted to it a locking lever or piece 296, (see Figs. 5 and 11,) having a lug 300, which projects sidewise from locking-lever 296 and over a cut-away portion of disk 26, forming a shoulder 301. (Shown in Fig. 11.) In this normal position of the parts motion is transmitted from shaft 6 and disk 25 through locking-piece 296 and lug 300 and shoulder 301 to disk 26 and sleeve 5 and to the wheels thereon to be presently described. When crank 2 has nearly made a full revolution and the printing or adding has been completed, the end of locking-piece 296 passes over a cam 299, secured to the framework of the machine, and is pressed upward, lifting the lug out of engagement with the shoulder. Sleeve 5 is then free to return to its original position and is moved backward through its parts in the manner presently to be described.

By means of the above-described construction crank 2 can be rotated in the same way at all times, and the reciprocating rocking motion necessary to permit type-setting can still be obtained. By making shaft 6 long and running it across the machine and by making the parts carrying the wheels in the form of a sleeve mounted upon it I am enabled to give a long bearing-surface to both parts, thus insuring a steady regular action of the parts, free from wabbling or irregularity or jerking, and I am also enabled to make the parts strong and durable and increase the efficiency of the connection between them. Both the crank-wheel and its shaft and the sleeve run true and regular and are free from any irregular sidewise wabbling motion.

Backward rotation of shaft 6 is prevented by means of a pawl and ratchet in the usual way. Upon the sleeve are mounted a number of wheels, one for each series of keys, to transfer the motion of the shaft to the type-wheels, bringing the proper characters upon the reading or adding line. These wheels are composed of two parts—one part, 8, fixedly connected to sleeve 5 and the other part, 7, mounted loosely thereon. I provide a detachable lock which is adapted to connect the two parts together to cause the fast part to rotate the loose part a certain distance, whereupon the lock is operated automatically to disconnect them to permit the loose part to stop while the fast part rotates onward with the shaft. As shown in Fig. 9, this detachable lock consists of a swinging piece 35, pivoted to loose part 7 of the wheel and normally held by a spring 36 in the position shown in Fig. 27. Swinging piece 35 has a projecting knob 4, adapted to strike the lower part of the stem or shaft of the key when depressed, and it has also a lug 37, adapted normally to lie over a shoulder 38 on the fast part 8 of the wheel. In this position of the shoulder and lug the fast part will rotate the loose part as the main shaft is rotated until the knob 4 strikes against a stop formed by the inner end of a key. This tips piece 35, throwing lug 37 out of engagement with shoulder 38, whereupon fast part 8 of the wheel is rotated by the shaft and the crank farther on. The distance that the loose part of the shaft rotates is of course dependent upon which one of its series of keys is depressed. Through the teeth 9 of its segment meshing with teeth 10 on type-wheel 11 the type-wheel is rotated a similar distance, bringing that one of type 12 upon the printing-line which corresponds with the number of the key which has been depressed. In this way I provide a plurality of wheels arranged upon sleeve 5, the number of wheels corresponding with the number of series of keys, and each wheel is sufficiently independent of all the other wheels to be able to travel its own distance irrespective of that traveled by the other wheels, enabling each wheel to bring its printed number upon the proper line.

A spring 39 connects the fast and loose parts of each wheel together and insures that the loose part 7 will be held snugly with its knob 4 against the stem of the depressed key during the printing and adding operation. As is shown, spring 39 is arranged between the parts of the wheel.

When sleeve 5 is released from its connection with shaft 6, it is returned to its original position by means of a series of springs 40, connecting with segments 19. These springs have been strained during the forward movements of the parts and at the close return segments 19, type-wheels 11, fast part of the wheel 8, and the sleeve all to their original position. In the backward movement of the fast part 8 shoulder 38 strikes against a rubber buffer 41, secured to the loose part 7 of the same wheel, carrying the loose part back to its original position.

In order to equalize the pressure upon the crank and shaft and sleeve throughout their rotation, the wheels and the segments of the type-wheels which mesh with the loose parts of the wheels are arranged in echelon, as shown in Fig. 3. By these means the work of rotating the different parts is distributed in equal parts throughout the rotation of the crank, and the work of returning the segments, type-wheels, sleeve, and its wheels is taken up in turn by each set of springs 40. The two springs 40 of each set are connected by a bell-crank 42, pivoted to 43, merely to insure a better spring action.

*Type-wheels, their locking-pawls, and their releasing mechanism.*—These devices are best illustrated in Figs. 3, 5, 7, 10, 12, 13, and 27. After the type-wheels 11 have been moved into their set position they are held in that position by a series of pawls 14, one for each type-wheel, and each pawl is loosely mounted upon a rod 15 and held by a spring 44 normally in engagement with the ratchet-teeth 45 of its type-wheel 11, holding these type-wheels in any position in which they are moved. These type-wheels are released from the action of the pawls by means of a releasing-bar 46 (shown as slightly pointed at one end in Fig. 27) and provided at one end with a fixedly-secured bell-crank arm 47, pivoted at 48. The free end of the bell-crank 47 is secured to bell-crank 49, pivoted at 50, as shown in Fig. 5, the other arm of the bell-crank carrying a toe 21, which is adapted at the very end of the rotation of wheel $2^a$, operated through crank 2, to be struck by a lug 52 on that wheel. This throws the toe of releasing-bar 46 upward, freeing the entire series of pawls 14 from ratchets 45, thereupon springs 40 immediately restoring the type-wheels, segments, sleeve 5, and connecting parts to their normal positions ready for the next operation.

In order to permit the use of keys of sufficient size to space them properly for practical use and to permit room for the wheels upon the sleeve of the main shaft and yet to have the type 12 on the type-wheels 11 and the type on the total-adding wheels close together, so that they may be easily seen and read and may be printed compactly, the supports for the type-wheels are arranged in the form of hollow shafts nested within one another, as clearly shown in Figs. 10, 12, and 13, where the segments carrying the teeth 10 are shown as mounted each upon one end upon a shaft 53, at the other or inner end of which is mounted the segment carrying the type 12. In order to use the number of series of type 12 on these type-wheels 11, (shown in the drawings,) I have found that these segments overlap two of the segments carrying the teeth 10. On this account I have arranged the pawls 14 so that the pawls of the outer segment on each side carrying the type 12 are arranged on the outer side of such segments, while the other pawls are all arranged on the inner side, as clearly shown on Figs. 10, 12, and 13. This arrangement leaves space between the outer and the next inner segment carrying the type 12, within which a segment carrying teeth 10 can move as it is rotated back and forth. By thus arranging the type-wheels in the form of hollow and cut-away shafts and nesting them and by arranging the retaining-pawls in the manner above indicated I am enabled to make the printing-type and adding-type compact, while leaving plenty of room for the keys and the mechanism connecting them with the type-wheels. It will be of course understood that the inner end of each sleeve 53 also carries a dependent segment that is provided with the teeth 18 for adding purposes, thus insuring that the total-adding wheels will also be compactly arranged.

*The adding-wheels and their carrying devices.*—These are illustrated especially in Figs. 3, 21, 23, 25, and 27. As above stated a reciprocating motion is imparted from the type-wheels 11 through teeth 18 to segments 19. As each segment 19 moves in the direction of the arrow shown in Fig. 23 a spring-pressed pawl 54 on each segment 19 engages with ratchet-teeth 55 on carrying-wheel 20 and rotates that wheel the number of teeth corresponding to the movement of type-wheel 11. A pawl 56 is held by spring 57 and engages with the gear-teeth, also secured to carrying-wheel 20, and prevents backward rotation. The gear of wheel 20 meshes with the gear of wheel 21 and through spring-pressed carrying-pawls $57^a$ carries to the next adjoining wheel 20 of the next higher order of digits at each ten-tooth movement of the wheel 20 of the next higher order. As many wheels 20 are provided as there are type-wheels, and they are all loosely mounted upon shaft 58, and each of the wheels has a carrying-wheel 21, which wheels are loosely mounted upon shaft 59. Each wheel 21, except the one of the highest order, is provided with the carrying mechanism above described. Each wheel 21 meshes with a corresponding wheel 22, a pawl 59 acting to prevent undue movement of the wheel. The transferring-wheels 22 are loosely mounted on shaft 60 and each meshes with a gear-wheel 23, mounted on the shaft 24 of one of the total-adding wheels 17. These wheels are mounted loosely on shaft 24. By these means the numbers set up in type 12 on the printing-line are added, the total appearing on the adding or printing line of the total-adding wheels 17.

*Devices for resetting the total-adding wheels.*—These are especially illustrated in Figs. 1, 3, 5, 13, and 22. For this purpose I provide a series of resetting-wheels 61, which are shown in detail in Fig. 22. As many of these resetting-wheels are provided as there are transferring-wheels 22. The resetting-wheels are mounted on a shaft 62, and between adjacent resetting-wheels are fiber disks 63. Both disks and wheels are free to slip longitudinally along shaft 62. The fiber disks are provided each with a rib or projection which projects into a longitudinal groove in shaft 62, so that they cannot rotate on the shaft, while wheels 61 have no such projection and are accordingly able to rotate on the shaft. They are, however, normally held frictionally, so as to rotate with the shaft except when positively held. To this end a spring 64, lying between a fixed collar 65 and a movable collar 66 on the shaft, presses all of the wheels and disks together against the fixed stop 67. This frictional engagement is sufficient when the shaft is rotated to reset the total-adding wheels and the transferring and carrying wheels 22 and 21 when the wheels 61 are in engagement with wheels 22, as described below. Transferring-wheels 22 and carrying-wheels 21, with their shafts 60 and 59, are carried on a swinging frame 68, swinging freely on the shaft 24 of the total-adding wheels. This construction is to enable the total-adding wheels 17 and wheels 22 and 21 to be separated from the mechanism which drives them in the regular process of addition and to permit them to be brought into contact with the resetting-wheels. This is done by means of a resetting-wheel 69 on the outside of the machine, which is adapted to be manually operated. On the shaft 70 of this wheel are mounted eccentrics 71, which are each connected by a link 72 to the bottom of frame 68. As resetting-wheel 69 is turned cams 71 swing frame 68 to the right, as viewed in Figs. 5 and 23, and separate wheels 20 and 21, at the same time bringing wheels 22 into mesh with the resetting-wheels 61. The further rotation of wheel 69 through a mutilated gear 73, mounted on shaft 70, meshing with gear 74 on shaft 62 of the resetting-wheels, turns those wheels and through them resets to zero total-adding wheels 17 and brings wheels 22 and 21 into the position shown in Fig. 23, which is the position they should occupy when the total-adding wheels are at zero. The mutilated gear 73 is made of such a length that it will rotate the resetting-wheels twice, thus insuring that the adding-wheels and wheels 22 and 21 will be brought to their proper position. When any adding-wheel and its corresponding wheels 22 and 21 reach their zero positions, the corresponding resetting-wheel 61 is held in locked position; but by reason of the frictional engagement with its shaft of the other resetting-wheels the other resetting-wheels are enabled to continue their rotation until each one has brought its adding-wheel and transferring and carrying wheel to the zero position.

By improved means resetting the total-adding wheels and their connecting parts are reset in their positions with certainty and despatch. Only one action on the part of the operator is required—namely, to turn wheel 69—which single operation severs the connection between the total-adding wheels and their connecting parts, and the rest of the driving mechanism connecting them with the resetting-wheels resets them and then restores them to their original positions, breaking their connection with the resetting-wheels. Little power is required in resetting the parts, and in the normal operation of adding the resetting-wheels are not in operation, thus lessening the friction in the regular running of the machine.

Each transferring-wheel 22 is provided with a stop 75, against which pins 76 on the side of each wheel 22 are adapted to take when the total-adding wheels and wheels 22 and 21 have been moved back to their zero or original positions. When frame 68 is swung to the right, as shown in Fig. 23, for resetting purposes and the wheels are reset, one of the pins 76 will come into contact with stop 75 when wheel 22 has reached its original position and will stop the process so far as that wheel and its total-adding wheel 17 and wheel 21 are concerned. These pins 76 are arranged at a distance of ten teeth apart. In resetting the wheels 22 are rotated in the same direction as in adding.

Pawls 57$^a$ are loosely mounted on shaft 59 and are free to move a slight distance between pins 77 and 78, spring 79 tending to press pawls 57$^a$ against pins 77. By means of this arrangement wheel 21 is reset to its original position. The back of pawl 57$^a$ is pressed snugly up against the back of teeth of ratchet 55, the spring allowing it to give a little. The wheel is therefore in the exact position that it should occupy when its adding-wheel is exactly at zero. By these means I insure that wheel 21 shall not carry to the next higher wheel 20 until the proper time. I have found that without such a yielding arrangement of pawls 57$^a$ the said pawls and the teeth of ratchet-wheel 55 are apt to bind, and thus block the machine or cause a breakage somewhere.

*Alining total-adding wheels.*—This is illustrated especially in Figs. 20 and 23. I have found in practice that the numbers upon the total-adding wheels are apt to get slightly out of alinement and that it is important to aline them during each operation of the machine. I have accordingly provided means for this purpose. The preferred means shown in the drawings consists of the following: Upon wheel 80, fixedly mounted on shaft 6, I provide a cam 81. Upon a rock-shaft 82, mounted in suitable bearings in the framework of the machine, I fixedly mount a series of pawls 83, each provided with a toe 84, adapted to take into the tooth of a transferring-wheel 22. I connect wheel 80 and cam 81 by any suitable means with rock-shaft 82, so that the cam will cause the toes 84 of pawls 83 to enter between two of the gear-teeth of each wheel 22 and bring it to the proper alinement should it be out of alinement. The connections between the cam and rock-shaft 82, as shown, consists of a bell-crank lever 85, pivoted at 86 and pivotally connected by link 87 with an arm 88, fixedly mounted on rock-shaft 82. By these means a positive alinement is secured at each operation of the machine.

*Hammer mechanism.*—This is illustrated especially in Figs. 1, 2, 3, 4, 5, 10, 12, 13, 14, 17, 20, 26, and 28. I provide a series of hammers, one for each series of keys and its corresponding type-bearing segment 11, except that I preferably provide but one hammer for both the tens and units of cents, and I also provide a separate hammer 13$^a$ for segment-disk 150, carrying certain words—such, for example, as are shown on the index 89 on the front of the machine. (See Figs. 2 and 12.) Each hammer is mounted upon a sleeve 90, and the various sleeves 90 are arranged loosely and concentrically with one another upon a supporting-rod 91. Rod 91 is mounted in the side supports 92 of a carriage 93, which is slidingly mounted upon side rods 94, secured in the framework of the machine. Carriage 93 is composed of side supports 92 and cross-bars 95 and is movable longitudinally upon side rods 94. The object of making the carriage movable longitudinally is to enable the carriage to be moved backward to print the totals on the total-adding wheels whenever desired and to move it forward upon the printing-line of the type 12. Carriage 93 also carries a cross-slide 93$^a$, upon which is mounted paper-roll 96 of the paper 16 and the paper-rolls 200 and 201, which will be presently described.

I preferably provide means for operating the hammers independently of one another to a greater or less extent and preferably employ such means for this purpose which are normally out of operative range or position to operate the hammers and provide means adapted to be actuated by a key of any series to cause such means and the hammer corresponding to the series to which the said key belongs to be brought within operative position or range of each other and then cause the said means to operate the hammer as the machine is operated, as in the form shown in the drawings, by the turning of crank-wheel 2, all in a manner to be presently described. In my preferred form I move such operative means within operative range of the hammers or their connecting devices as the key is operated. I will now proceed to describe the particular devices shown in the drawings for this purpose. Of course the particular means employed may be widely varied without departing from my invention. As shown in Figs. 14 and 17, the stem of each key is provided with a roller 97, resting normally on the top of a swinging bar 98, the said bar carrying the rollers 97 of all the keys of the same series. When any key of the series is depressed, its roller 97 forces swinging bar 98 downward and to the right, as shown in Fig. 14, as swinging bar 98 is supported at each end upon swinging arms 99 and 99$^a$, pivoted at 100. A lower extension of arm 99 connects pivotally with a rod 101, which is pivotally connected at its other end (see Fig. 3) with an arm 102, dependent from and secured to one of a set of sleeves 103, concentrically and loosely arranged on a rod 104, which runs from one side of the machine to the other, as shown in Fig. 13. These sleeves are so arranged on the shaft that three of them are on one side of the machine and four on the other, as shown in Fig. 13. Depending from each sleeve 104 is an arm 105, (see Fig. 4,) which is secured to the sleeve at its end near the side of the machine. Sleeves 104 are hollow and are so nested or arranged as to run one through another. Each rod 105 has pivotally connected to it a bar 106. (See Fig. 4.) Three of these bars are shown in Fig. 13 as at one side of the machine and four at the other. Each bar 106 is connected at its other end to a swinging arm 107, (see Figs. 4 and 26,) pivoted at 108 in the framework. The latter arm carries at its upper end a trigger 109, loosely pivoted at 110 to arm 107 and having toes 111 and 112. As the key is depressed swinging arm 107 is pulled toward an upright position, bringing toe 112 opposite to and in alinement with a downward projection 113 from its corresponding hammer-sleeve 90. In this position the trigger has been moved into operative position all ready to strike projection 113 and trip its hammer. This tripping of projection 113 and operation of the hammer is accomplished through crank-wheel 2 by means of a cam 114, mounted on shaft 6, on the opposite side of the machine from crank-wheel 2, as clearly shown in Fig. 5. The parts connecting cam 114 and the different triggers, as shown in the drawings, consist of the different devices—viz., a bell-crank lever 115, mounted on stud 116 in the framework, a roller 117, engaging with cam 114. As shaft 6 turns, the roller and lever 115 are slowly moved to the right, as viewed in Fig. 5, pushing in the same direction rod 118, pivotally connected to the end of one arm of lever 115.

119 is a crank-shaft connecting rod 118 with rock-shaft 120, which runs from one side of the machine to the other, as shown in Fig. 10, and which has at its two outer ends each a crank-shaft 121, each pivotally connected to a rod 122. Each rod 122 is pivotally connected to a short arm 123, fixed upon a sleeve 124, mounted upon a short stud 125, to which is rigidly secured a plate 126. There is one of these plates on each side of the machine, as shown in Fig. 10. As roller 117 is slowly forced to the right, as viewed in Fig. 5, each plate 126 is slowly forced down in engagement with toe 111 of the different triggers 109 on each side of the machine, forcing toes 112 against the projections 113 of the different sleeves. The triggers and toes are held in rigid position by means of a stop-pin 127 on arm 107. It will of course be understood that each plate 126 in this action will only operate upon such of the triggers as have been brought into operative position. Each of such triggers through its toe 112 gradually forces projection 113 to the left, as viewed in Fig. 14, straining spring 128 until toe 111 slips by projection 113, when spring 128 throws its sleeve and hammer sharply into their original position. A stop 129 on the sleeve engages with a spring-stop 130 just before the hammer-head strikes the paper. The force of the blow is sufficient, however, to momentarily spring the hammer-arm and spring-stop 130 and deliver a sharp printing blow. All of the hammers representing the orders of numbers set up on the keys are of course operated at the same moment, and a number corresponding to that set up upon the keys is printed on the paper.

Stop 130 normally holds the hammer-faces just slightly above the paper and out of engagement with it.

Cam 114 is so shaped and the other parts are so arranged that the printing is done at the end of the operation of crank-wheel 2 and just before the machine stops.

By the above means the numbers set up upon the keys are automatically printed by the machine just before the keys that have been depressed are returned to their normal positions, and I am enabled to use individual hammers, one for each series of keys. As cents, both units and tens, are always printed, I preferably use but one hammer for them, which is the one opposite the side of the hammer 13ª, (see Fig. 2,) and of course I employ but one sleeve 90 for that purpose. Accordingly I use but one sleeve 103 for the units and tens of cents; but as each series of cents has to have for other reasons its same equipment of swinging bar 98, levers 99, rods 101, &c., I connect the arm 102 of each of these series with the same sleeve 103, as appears in Fig. 13.

The means for returning triggers and the other parts to their normal position after each operation of the machine will be presently described.

When it is desired to print a total from the total-adding wheels, the carriage 93 is pushed sharply backward along rods 94, and the total on those wheels will be automatically printed. For this purpose I provide a series of triggers—one for each series of keys and one or more additional ones for higher orders to which the addition may bring the figures—and arrange these triggers so that whenever any key of any series is operated the trigger corresponding to that series and the projection 113 from the sleeve of the corresponding hammer will be brought into operative alinement or position relative to each other, or when the adding-wheels carry to the next higher order the trigger representing that higher order and the projection from the sleeve of its corresponding hammer will be brought into similar relationship to each other. I prefer to do this by causing the operation of the key or the carrying-wheel to a higher number in the addition to move the proper trigger into a position where it is in alinement with the proper projection and ready to operate such projection to deliver a printing blow when the proper time arrives. I will now proceed to describe the preferred mechanism by which I accomplish this, as shown in the drawings.

In order to insure that each key when depressed will move its trigger 131 (see Fig. 4) for actuating its hammer to print the number on the corresponding series of the total-adding wheels, I connect swinging arm 107 by means of a link 132 with a similar swinging arm 133, which carries rigid at its upper end trigger 131. As this trigger when once set remains in fixed position at all times until the total-adding wheels are reset, I permanently latch springing arm 133 in its set position by means of a latch 134 on the end of loosely-pivoted arm 135, adapted to engage with a pin 136, projecting from the side of arm 133. Whenever carriage 93 is pushed backward to print the totals, projections 113 will strike such of the triggers 131 as have been set and will cause their corresponding hammers to print the totals appearing on the total-adding wheels in the manner described for the printing of the figures on the printing-line. As the units and tens of cents will always be printed on the total-adding wheels irrespective of what is done upon the machine, I preferably arrange a fixed stop 137 (shown in Fig. 13) for operating the cents-hammer. In order to insure that where the adding-wheels carry higher order of numbers the trigger 121 of that higher order shall be set, I also connect one of the adding-wheels with each trigger, so that upon carrying to a higher order the trigger of the higher order will be set. In the forms shown in the drawings I do this from wheel 22 by the following means: Pins 138 on wheel 22 are placed ten digits apart, and when the machine is at zero they are in the position shown in Fig. 3, with one of the pins resting against one arm of the bell-crank lever 139, pivoted on stud 140. Connected to lever 139 is a rod 141, and to it is connected an arm 142, rigidly secured to a sleeve 143 on a stationary rod 144. (Shown in Figs. 3 and 13.) These sleeves 143 are hollow and are arranged concentrically on the rod, one within another, three of them on one side of the machine and four on the other, as shown in Fig. 13. Each sleeve is rigidly connected at its other end to an arm 145, which is pivotally connected to a rod 146, (see Fig. 4,) which rod is pivotally connected at its other end to swinging arm 133. As wheel 22 begins its movement pin 138, which lies snugly against bell-crank lever 139, moves that lever and through the connections above described immediately moves the trigger 131 corresponding with the next higher order into its set position, where it is held until the adding-wheels are reset, as hereinafter described. This operation of setting the triggers 131 from the adding-wheels is wholly independent of the setting of the triggers directly from the operation of the keys. In order to avoid any interference of the one with the other, each rod 132 is provided at its right-hand end, as seen in Fig. 4, with a slot 147, which takes over a pin 148 of swinging arm 133. By this arrangement swinging arm 133 can be moved into its vertical position irrespective of its swinging arm 107, while the movement of a swinging arm 107 will always bring its corresponding swinging arm 133 into its vertical position if it has not already been placed there.

By the means above described I am enabled to quickly and easily print the totals from the printing adding-wheels at any time. All that is required is to push carriage 93 sharply backward to its limit of movement, and the printing is automatically done at substantially the close of that movement. In order to insure that the printing shall not be done while the carriage and paper are moving, I provide a stop 149 to check the backward movement of the carriage and to arrange the said triggers 131 in such position that they will operate the hammers to cause them to deliver their printing blow the instant the carriage has stopped against stop 149.

In the machine shown in the drawings I have shown the characters intended to be printed by the machine as numbers, which will ordinarily be the case in practical use. Any suitable characters may, however, be employed in place of numbers, if desired. In addition to the numbers shown in the drawings I also preferably provide means for printing alongside of each number upon the paper, means for printing suitable words—such as, for example, would be used in banking—and in Fig. 2 on index 89 at the side of the bank of keys I have shown a list of words, any one of which may be printed opposite the number upon the paper. To accomplish this, I provide a printing-disk 150, bearing upon its periphery type representing the words appearing on index 89 and in the order there appearing. This printing-disk is mounted alongside of the type-wheels 11, as shown in Fig. 12. It is operated, as shown, manually by the operator through the following means: Knurled button 151, (see Figs. 2 and 4,) carrying pointer 152, is provided at the side of the index and is arranged so as to be screwed into fixed position or to be unscrewed so as to be moved along the index, carrying the pointer with it. By moving the pointer along the index opposite to any word printed thereon type representing that word upon disk 150 is brought upon printing-line. This is done through a slide 153, moved by the button 151 along guides 154. Pivoted to slide 153 is a rod 155, secured at its upper end to rack 156, the latter meshing with gear 157 on shaft 158. This shaft at its other end carries gear 159, meshing with gear 160 on the hub of disk 150. By moving button 151 and bringing pointer opposite any word on index 89 and by fastening the button in that position the corresponding word will be brought upon the printing-line and will be printed when the machine is operated through hammer 13ª in a manner already described.

The trigger 109 for operating hammer 13ª is brought into operative position manually by the operator by the following mechanism: The operator turns knurled button 161 at the side of the machine, (see Fig. 13,) which button is fixedly mounted on shaft 162, (see Fig. 4,) upon which is also mounted a cam 163. As the button is rotated it raises one arm of bell-crank lever 164, which is connected to one of the rods 106, thus raising trigger 109 and its toe 112 into operative position. The trigger is then operated by the turning of main shaft 6 in the manner already described. When it is desired to return the parts to their normal positions after printing, button 161 is turned slightly farther, so that lever 164 can be restored to its original position.

After printing, the triggers 109 and all their connecting parts, including the rods 106 and 101, sleeves, bar 98, and the keys, and all the intermediate connecting mechanism in the positions into which they have been moved, are automatically restored to their original positions. This is done by means of a cam on a cam-wheel 166, fast on shaft 6. Away at the close of the rotation of the shaft of crank-wheel 2 cam 165 strikes a projection 167, mounted on a sleeve 168 of shaft 169, which stretches across the machine, as shown in Fig. 7. Fixed upon this shaft by two separate arms 170 is a releasing-rod 171, which also stretches across the machine immediately back of the levers 99. When cam 165 strikes projection 167, it swings releasing-rod 171 against all of the levers 99, moving them to the right, as shown in Fig. 3, and restoring all of the above parts, including the keys and all their connections and the triggers 109 and all their connections, to their normal positions. All of these parts move frictionally and are frictionally held in any position into which they are moved.

The triggers 131 for printing the totals of the adding-wheels are reset only when the adding-wheels are reset and by means presently to be described.

In Figs. 31 and 32 I have shown a modification of the trigger mechanism. The operation is substantially the same except, however, that instead of mounting triggers 109 and 131 upon swinging arms I mount them on sliding frames 172 and 173, respectively, these frames being free to slide horizontally through guides 174. To this end rods 106 are each connected to a sliding frame 172. In order to permit the relative freedom of movement between triggers 131 and 109, the two sliding frames 172 and 173 are provided with grooves 175 and 176, respectively, and with projections 177 and 178, respectively. In all their respects the construction of these parts is identical with that heretofore shown and described.

When the total-adding wheels and other connections are reset, the triggers 131 are also returned to their normal position by the resetting devices by means of a cam 277, mounted on shaft 70. (See Fig. 4.) By means of a bell-crank 278, pivoted at 279 and having a rod 280, which passes under all of the latches 135, cam 277, through lever 278 and its rod 280, detaches latches 135 from pins 136 and the triggers are returned to their normal positions.

In the machine shown in the drawings the type-wheels of the adding-wheels have a zero normally on the printing or adding line. If you therefore strike any key except those of the lowest order and wish to have ciphers in all or any of the places of lower order, it is not necessary to strike the keys of such orders, as the zero is already on the printing or adding line. It is, however, necessary to print such zero of lower orders, and for that purpose the triggers of such orders must be placed in operative position so to actuate their respective hammers. For this reason I preferably provide means so that when a key of any order except the lowest is struck it will set the triggers of all the lower orders. Any suitable devices for this purpose may be used. What I prefer to use for the purpose is illustrated in Figs. 13 and 28. For this purpose each sleeve 103 on shaft 104 is provided with a horn 281, rigidly secured to the sleeve and extending over in front of a shoulder 282, secured to the adjoining sleeve 103 of a lower order. Accordingly when any sleeve is rotated by its key its horn 281 moves the adjoining sleeve 103 of a lower order and its horn, and the latter sleeve moves the sleeve of the next adjoining lower order, and so on to the end. Thus, for example, if it is desired to set up and print "$1000" the key 1 in the thousand series of keys is struck, and all of the triggers from that series down are immediately set into operative position, so that no other key need be struck to set up the proper type or the proper triggers. After any adding-wheel 22 through one of its pins 138 has set up the trigger of the next highest order the end of lever 139 has, of course, been pushed out of range of pins 138; but when the carrying-wheels and other supporting-frame are swung to the right to be reset the path of pins 138 will again be in line with levers 139, and in resetting the machine something would have to break when a pin 138 struck its lever 139. To avoid this, I provide means automatically actuated by the resetting devices at the beginning of their operation to throw shaft 140, with all its levers 139, sidewise, so that the levers 139 will no longer be in the path of pins 138. This I accomplish by means of a cam 292, mounted on shaft 70 of the resetting devices, said cam lifting one end of a lever 293, pivoted at 294, as shown in Fig. 20, and throwing the other end of the lever in contrary direction. The said last-mentioned end of lever 293 has two fingers 295 entering between collars on shaft 140, and as the lever is moved the entire shaft 140, with its levers 139, is thrown slightly edgewise for the purpose above described. Shaft 140 is restored to its normal position at the end of cam 292, as shown in Fig. 20.

*Paper-feed mechanism.*—This is illustrated especially in Figs. 1, 2, 3, and 10. Any suitable means may be provided for feeding the paper. That shown in the drawings is as follows: Fast upon shaft 6 is a gear-wheel 179, (shown in Fig. 1,) provided with a pin 180, which projects within a slot 181 in a cam 182, loose upon the shaft. As crank 2 and shaft 6 start to rotate pin 180 travels, with its gear-wheel, to the end of slot 181 and then picks up and pushes before it cam 182.

183 is a yoke having a roller 184 resting upon cam 182. This yoke is gradually raised as the shaft rotates. Connected to the two ends of yoke 183 are arms 185 and 186, to the latter of which is secured a bell-crank 187. Motion is imparted from this bell-crank through link 188 to a piece 189, provided with a slot 190. Piece 189 is loosely secured on stud 191 and rocks thereon, raising and lowering rod 192 through a pin 193, projecting from it into slot 190. Fingers 194 of rod 192 embrace a pin on stud 190 in the usual manner. At its upper end rod 192 pivotally carries an arm 195, mounted on the shaft 196 of a gear 197 and carrying a spring press-pawl 198, which meshes with a ratchet-wheel 199, integral with gear 197. Gear 197 meshes with gearing and with paper-feeding gear-wheels 200 and 201, mounted upon the carriage, as also shown in Fig. 3. The paper 16 passes from roll 96 under an idle roller and under the hammers and then passes under a plate 202, sharply upward between rolls 200 and 201, and across a knife cutting edge 203, where it may be severed at any time, if desired. Cam 182, pin 180, slot 181, and the other connections are so arranged that the printing is done at the very end of the operation, and the paper is fed immediately thereafter, and the number just printed is thus at once brought upon the face of plate 202 into a position where it is distinctly visible to the operator, as clearly shown in Figs. 3 and 10. The feeding takes place the moment roller 184 drops off from the surface of cam 182.

In view of the echelon arrangement of the type-wheels I have found it difficult in a single revolution of the main shaft to accomplish all the work that is required to be done, and in order to obtain the advantage of more than a complete revolution of that shaft without, in fact, rotating it more than a complete rotation I have devised the arrangement of the slot in cam 182 with pin 180 on the gear-wheel and the roller 184 and the angle of the edge 204 of cam 182 (shown in Fig. 1) in order that the feeding of the paper should be done practically after the complete rotation of the wheel. When the revolution of the wheel is complete, roller 184 is at the top of the face 204 of the cam; but by the pull of the spring 205 upon piece 189, and hence upon yoke 183, the roller 184 is forced downward after the complete revolution, and during that time the feeding is effected. This is made possible by means of the slot and pin and surface 204, as above described. In fact, I obtain the benefit of substantially forty extra degrees of revolution.

As it is sometimes desirable to shift the carriage sidewise, I have preferably made the gear-wheel which meshes with the paper-feeding gear 200 extend along the wheel, as shown in Fig. 2 at 206, in order that the two gears 200 and 206 may be in mesh no matter what the lateral position of the carriage.

If at any time after printing the totals from the total-adding wheels the operator desires to print or add more numbers, he turns the knurled button 283, Fig. 10, by hand, so as to feed the paper strip one space. This should be done before pulling the carriage forward into its usual position.

*Ribbon-feed mechanism.*—These are illustrated in Figs. 6, 10, 20, and 25. As shown, two ink-ribbons 228 are provided, one for the printing-line and the other for printing the totals of the total-adding wheels. Each ribbon is mounted in the usual way on spools 229 and passes from one to the other of these spools over guides 230. I preferably mount these spools so that they may be easily taken out, and this arrangement is clearly shown in Fig. 25. For this purpose I provide a detachable shaft 231, which can be inserted or removed through bearings 232 and which carries fast upon it a beveled gear 233. Each spool has an opening 234 in its center to receive the shaft. The shaft is made hollow at its end to take over a spring press-pin 235. The bearings 232 are made to yield longitudinally, and a spring 236 presses against the collar of the same to hold the parts in proper position. Each shaft 231 is similarly provided. Gear-wheels 233 are driven alternately from a common shaft 237, so that the feed is first in one direction and then the other. The change in the direction of feed is occasioned through levers 238, connected by an arm 239, one of the levers having a disk 240, projecting between two collars on shaft 237, to slide the shaft one way or the other as the levers 238 are moved one way or the other by buttons 241, one of each of which is secured near each end of one of the ribbons in the ordinary way. Each button 241, when the ribbon has been fed in one direction as far as it should go, strikes against one of the levers 238 and disconnects one gear 242 on shaft 237 from its gear 233 and connects the other gear 242 with the other gear 233, thus changing the direction of feed. The ink-ribbons can be at any time moved either way as desired manually through knurl-buttons 243 and 244.

Inasmuch as the feed of each ink-ribbon is slow and is in the direction of the length of the lines of the type on the type-wheels 11 and total-adding wheels 17 and as many type are likely to fall on the same part of the ink-ribbon under these circumstances, especially in a machine of the character of the one here shown and described, I preferably arrange the ink-ribbons so that they shall be slightly inclined to the lines of type upon the type-wheels 11 and total-adding wheels 17. Owing to this slight angular arrangement of the ink-ribbons, which is clearly shown in Fig. 25, the type will not often fall upon the same spot, but upon slightly-different places on the ink-ribbon, all of the ink-ribbon will be used, and the printing will be much more distinct.

In case it is desired to operate the machine by other than hand-power I provide means for operating by foot-power, and such means are illustrated in Figs. 1, 29, and 30. In this case instead of connecting shaft 6 and gear-wheel 179 with hand-crank 2 I connect gear-wheel 179 with gearing and provide a device to be operated by the feet and flexible connections between the same and the gearing and means for returning the pedal and flexible connections to their original positions. 245 is the pedal. It is connected by a cord 246, which runs over the pulley 247, with one part of a drum 248, which is loose upon shaft 249. As the pedal is depressed this drum is rotated in one direction and through a pawl 250, which it carries, and a ratchet 251, also loose upon said shaft and connected fixedly with gear 252, rotates gear 179 through an intermediate gear 253. Pawl 254 and ratchet 255, integral with gear 252, prevent backward rotation of these parts. The parts are so arranged that a complete movement of the pedal will rotate gear 179 once. When the feet are withdrawn from the pedal, cord 246 is rewound upon drum 248 by means of a ribbon 256, secured at one end to a spring 257 and at its other end to another part of drum 248, as shown in Fig. 30, upon which it is wound and unwound. Spring 257 through ribbon 256 restores the parts to their original positions after an operation of the machine. As it is necessary in the operation of the machine to rotate shaft 6 and gear 179 an exact revolution, no more or no less, I preferably provide a stop which will permit a complete and exact revolution of these parts, but which will prevent any additional revolution no matter how slight. I have illustrated in Fig. 11 the device which I prefer to use for this purpose. Upon wheel 26, which is fast to sleeve 5, I mount a stop-pin 258. 259 is a movable stop loosely pivoted at 260 in the framework and free to move between pins 261 on either side of it, these pins being also secured to the framework. Pins 261 act as stops to limit the swinging movement of movable stop 259. The parts are shown in full lines in Fig. 11 in the position they occupy before the operation of the machine, with stop-pin 258 lying snugly against the right-hand side of stop-pin 259. As the sleeve is about to complete its revolution pin 258 strikes the left-hand side of stop 259 and throws it over into the position shown in dotted lines in Fig. 11, and in this position it acts as a rigid stop to stop pin 258 and its disk and sleeve. It will be observed that the pin 258 is in exactly the same position at the end that it occupied at the beginning.

It is sometimes desirable to reprint the numbers set up in the printing-line. In order to accomplish this without the necessity of resetting or depressing the same keys, I provide a repeat-key 260 to throw the releasing mechanism out of operative position, so that the printing operation may be repeated without the necessity of resetting the keys. I accomplish this by providing the repeat-key with an inverted-cone-shaped lower end 261, (shown in Fig. 7,) which when depressed presses sidewise against a sloping upward projection 262 on the sleeve 168 of shaft 169. This sleeve 168 is made in the form of a sleeve loose on shaft 169, but connected so as to rotate with it by means of pin 263, integral with the shaft moving in slot 264 of the sleeve. A spring 265 keeps the sleeve 168 and its dependent arm 167 in proper position; but when the repeat-key is depressed sleeve 168 and arm 167 are shoved to the left, so that arm 167 is moved out of range of the releasing-cam on wheel 166. The operation of the machine, therefore, does not return the keys and their connecting parts to their original position, but leaves them and the type they have set up upon the printing-line still in the position for reprinting.

It is sometimes desirable, as where a mistake has been made in striking the keys, to release the keys thus struck and their connecting mechanism without operating the machine. For this purpose I provide a release-key 266, which is shown in Figs. 2 and 33. This key carries on its stem a pin 267, adapted to engage with one of a pair of toggle-levers 268, one of which is secured at 269 in the framework and the other of which is secured to the bottom of releasing-arm 170. When the release-key is depressed, it causes toggle-levers 268 to throw releasing-arm 170 to the right, as shown in Fig. 33, which throws releasing-rod 171 against rod 99, restoring the keys and their triggers to their normal position.

In order to bring wheel 2 to a sharp stop to prevent a too rapid operation of the machine, I provide a stop, which is shown in Figs. 4 and 5. The wheel 2 is provided with a pin 270. 271 is a lever pivoted at 272 in the framework and pressed by a spring 273. Toward the close of the revolution of wheel 2 pin 270 strikes on the under side of one arm of lever 271 and throws the other end 274 against a shoulder 275 of the wheel, bringing it to a complete stop. Projecting finger 276 of the lever prevents the lever from being thrown too far down on the surface of shoulder 275. Pin 270, lever 271, and shoulder 275 are so arranged that the moment lever 271 is thrown up 274 will make contact with shoulder 275. By that time pin 270 has cleared the other arm of the lever 271, and spring 273 immediately separates shoulder 274 and shoulder 275, permitting another operation of the wheel immediately thereafter, should the same be desired.

Shaft 237 is driven from shaft 120 (see Fig. 21) through crank-arm 284, link 285, lever 286, rod 287, slide 288, and guides 289 and carrying spring press-pawl 290, which engages with pawl 291 on shaft 237.

In the drawings herewith I have shown only the form or embodiment of my invention which I prefer; but my invention is not limited to such a form or embodiment. Many changes in or departures from the form shown in the drawings may be made without departing from my invention, the essentials of which are set forth in the claims appended hereto.

I do not in this application claim the printing mechanism or printing devices herein shown and described except as combined with the adding mechanism of my improved machine, as such printing mechanism and devices in or by themselves are claimed in another application of mine filed as a divisional application hereof.

What I claim as new, and desire to secure by Letters Patent, is as follows:

1. In a calculating-machine, the combination of adding-wheels, driving mechanism for moving them, resetting-wheels, and a manually-operated device adapted in a single operation to disconnect the adding-wheels and the driving mechanism and to connect the resetting-wheels and adding-wheels, to then reset the adding-wheels and to restore the parts to their original position.

2. In a calculating-machine, the combination of adding-wheels, driving mechanism for moving them, resetting-wheels, and a manually-operated device connected with the adding-wheels and the resetting-wheels adapted in a single operation to disconnect the adding-wheels and the driving mechanism and to connect the resetting-wheels and adding-wheels, to then reset the adding-wheels and to restore the parts to their original position.

3. In a calculating-machine, the combination of adding-wheels mounted in a movable frame, driving mechanism for moving them, fixed resetting-wheels normally out of mesh with the adding-wheels, and a manually-operated device for moving the adding-wheels into mesh with the resetting-wheels and disconnecting them from the driving mechanism and then resetting the adding-wheels, and then severing the connection between the resetting-wheels and the adding-wheels, and connecting the latter with the driving mechanism.

4. In a calculating-machine, the combination of adding-wheels, driving mechanism for moving them, resetting-wheels, a cam and gear-wheel mounted upon a shaft, the former connected with the adding-wheels and the latter meshing with a gear on the shaft of the resetting-wheels, and a hand device on the cam-shaft, all so arranged that by a single operation of said device the adding-wheels and driving mechanism will be separated, the adding-wheels and resetting-wheels be connected, the latter be rotated to reset the adding-wheels, and the parts be then restored to their original positions.

5. In an adding-machine, the combination of a series of resetting-wheels, a common driving-shaft upon which they are free to rotate, having a longitudinal slot therein, a series of frictional disks arranged on the shaft alternately with the resetting-wheels, the disks provided with a rib adapted to take into said slot so as to be positively driven by the shaft, and means for adjustably holding the disks and wheels in frictional contact with one another, whereby the resetting-wheels can be rotated and each wheel may stop when it has reset its adding-wheel without affecting the continued operation of the other wheels.

6. In a machine for bringing characters upon printing and adding lines, the combination of a series of keys, type-bearing and adding mechanisms, adapted to bring different numbers upon the printing and adding lines, connections between the series of keys and the type-bearing and adding mechanisms, whereby the operation of any key will bring upon said lines its corresponding number upon the type-bearing and adding mechanisms, a hammer for said lines, an operating device for each hammer, connections between the series of keys and hammer-operating devices adapted, when a key is operated, to throw said devices into operative position, and means for actuating each of said devices.

7. In a machine for bringing characters upon printing and adding lines, the combination of a bank of keys composed of a plurality of series, type-bearing and adding mechanisms, one for each series of keys, adapted to bring different numbers upon the printing and adding lines, connections between the keys of each series and its type-bearing and adding mechanisms, whereby the operation of any key of the series will bring upon said lines its corresponding number upon its type-bearing and adding mechanisms, a series of hammers for the printing-line and a series of hammers for the total-adding line, one hammer of each series for each series of keys, an operating device for each hammer, connections between each series of keys and its hammer-operating devices adapted when a key of the series is operated to throw said devices into operative position, and means for actuating such of the said devices as have been moved into operative position.

8. In a machine for bringing characters upon printing and adding lines, the combination of a bank of keys composed of a plurality of series, type-bearing and adding mechanisms, one for each series of keys, adapted to bring different numbers upon the printing and adding lines, connections between the keys of each series and its type-bearing and adding mechanisms, whereby the operation of any key of the series will bring upon said lines its corresponding number upon its type-bearing and adding mechanism, a series of hammers for the printing-line and a series of hammers for the total-adding line, one hammer of each series for each series of keys, an operating device for each hammer, connections between each series of keys and its hammer-operating devices adapted when a key of the series is operated to throw said devices into operative position, and means for actuating such of the said devices as have been moved into operative position, a series of catches for the operating devices of the hammers of the adding-line, adapted to lock in operative position such of the said devices as are moved into operative position, a resetting device for resetting the adding-wheels, and means connected with such resetting device for unlocking said catches, and means for returning the hammer-operating devices to their original positions.

9. In an adding-machine, the combination of a series of keys, adding-wheels therefor, connections between the keys and wheels to add upon the latter the number of the keys operated, a hammer, a device for operating said hammer normally out of operative position, connections between one of the adding-wheels and the hammer-operating device, adapted, when the said adding-wheel carries to a wheel of higher order, to set the said device in operative position, and means for actuating said device.

10. In an adding-machine, the combination of a bank of keys composed of a plurality of series, adding-wheels therefor, connections between the keys and wheels to add upon the latter the number of the keys operated, a series of hammers, one for each adding-wheel, a device for operating each hammer normally out of operative position, connections between each adding-wheel, but the highest, and the device for operating the hammer of the adding-wheel of the next higher order, adapted, when the said adding-wheel carries to a wheel of higher order, to set the said device in operative position, and means for actuating such of the hammer-operating devices as have been moved into operative position.

11. In an adding-machine, the combination of a bank of keys composed of a plurality of series, adding-wheels therefor, connections between the keys and wheels to add upon the latter the number of the keys operated, a series of hammers, one for each adding-wheel, a device for operating each hammer normally out of operative position, connections between each adding-wheel, but the highest, and the device for operating the hammer of the adding-wheel of the next higher order, adapted, when the said adding-wheel carries to a wheel of higher order, to set the said device in operative position, and means for actuating such of the hammer-operating devices as have been moved into operative position, a series of catches, adapted to lock in operative position such of the said devices as are moved into operative position, a resetting device for resetting the adding-wheels, and means connected with such resetting device for unlocking said catches, and means for returning the hammer-operating devices to their original positions.

12. In a machine for bringing characters upon printing or adding lines, the combination of a bank of keys composed of a plurality of series, type-bearing and adding mechanisms, one for each series of keys, adapted to bring different numbers upon the printing and adding lines, connections between the keys of each series and its type-bearing and adding mechanisms, whereby the operation of any key of the series will bring upon said lines its corresponding number upon its type-bearing and adding mechanism, a series of hammers for the printing-line and a series of hammers for the total-adding line, one hammer of each series for each series of keys, an operating device for each hammer, normally out of operative position, the two operating devices of each series being yieldingly connected together so that the setting of the operating device of a printing-line hammer will also set its operating device of the total-adding line, but the latter may be independently of and without affecting the former, connections between each series of keys and its hammer-operating devices, adapted when a key of the series is operated, to throw said devices into operative position, connections between each adding-wheel, but the highest, and the device for operating the hammer of the adding-wheel of the next higher order, to set the said device in operative position, and means for actuating such of the hammer-operating devices as have been moved into operative position, a series of catches for the operating devices of the hammers of the adding-line, adapted to lock in operative position such of the devices as are moved into operative position, a resetting device for resetting the adding-wheels, and means connected with such resetting device for unlocking said catches, and means for returning the hammer-operating devices to their original positions.

13. In an adding-machine, the combination of a hammer for the cents order and a trigger for operating the same, said hammer and trigger being in line with each other and adapted when one passes the other to operate the hammer.

14. In an adding-machine, the combination of a movable hammer for the cents order and a stationary trigger in the line of movement of said hammer adapted to trip said hammer to print when the hammer is moved past the trigger.

15. In a machine for bringing numbers upon a printing and also upon an adding line, the combination of a bank of keys composed of a plurality of series, adding-wheels, type-wheels, having their bodies in the form of sleeves nested one within another, each body bearing at one end a segment carrying the type for the printing-line and a gear-segment to connect with and drive the adding-wheels and bearing at the other end a gear-segment, and connections between the latter and its corresponding series of keys, for bringing upon the printing-line and the adding-line, numbers corresponding to the keys operated, whereby ample space may be provided for the keys and yet the type-wheels and the adding-wheels may be arranged in compact and close order.

In testimony whereof I have signed my name to this specification in the presence of two subscribing witnesses.

ALONZO R. BOYNTON.

Witnesses:
A. WARD FORD,
JOSHUA W. W. CAPEN.